US012777527B2

(12) United States Patent
Liu et al.

(10) Patent No.: US 12,777,527 B2
(45) Date of Patent: Oct. 27, 2026

(54) SYSTEMS AND METHODS FOR INDICATION OF A RANDOM ACCESS CHANNEL OCCASION

(71) Applicant: ZTE CORPORATION, Shenzhen (CN)

(72) Inventors: Juan Liu, Shenzhen (CN); Li Tian, Shenzhen (CN); Li Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 70 days.

(21) Appl. No.: 18/505,843

(22) Filed: Nov. 9, 2023

(65) Prior Publication Data

US 2024/0080908 A1 Mar. 7, 2024

Related U.S. Application Data

(63) Continuation of application No. PCT/CN2021/108853, filed on Jul. 28, 2021.

(51) Int. Cl.
*H04W 74/0833* (2024.01)
*H04L 5/00* (2006.01)

(52) U.S. Cl.
CPC ....... *H04W 74/0833* (2013.01); *H04L 5/0092* (2013.01)

(58) Field of Classification Search
CPC ............ H04W 74/0833; H04W 74/006; H04L 5/0092; H04L 5/0091; H04L 5/0053
See application file for complete search history.

(56) References Cited

U.S. PATENT DOCUMENTS

| | | | |
|---|---|---|---|
| 2020/0146054 A1 | 5/2020 | Jeon et al. | |
| 2021/0076411 A1* | 3/2021 | Ohara | H04W 72/0446 |
| 2022/0408492 A1* | 12/2022 | Shin | H04L 27/26 |
| 2024/0306208 A1* | 9/2024 | Shin | H04L 27/26025 |

FOREIGN PATENT DOCUMENTS

| | | |
|---|---|---|
| CN | 109451585 A | 3/2019 |
| CN | 109565889 A | 4/2019 |
| CN | 109997395 A | 7/2019 |
| EP | 4 228 369 A1 | 8/2023 |
| EP | 4 258 585 A1 | 10/2023 |
| EP | 4 280 783 A1 | 11/2023 |
| WO | WO-2020/198984 A1 | 10/2020 |
| WO | WO-2022/075795 A1 | 4/2022 |

(Continued)

OTHER PUBLICATIONS

Ericsson "Initial Access Aspects", 3GPP R1-2102788, Apr. 12-20, 2021 (Year: 2021).*

(Continued)

*Primary Examiner* — Chuong M Nguyen
(74) *Attorney, Agent, or Firm* — Foley & Lardner LLP

(57) ABSTRACT

Presented are systems and methods for indicating a random access channel (RACH) occasion (RO). A wireless communication device may receive a RACH signaling from a wireless communication node. The wireless communication device may determine a candidate starting symbol and/or an RO position set for a subcarrier spacing (SCS) higher than 120 kiloHertz (KHz) or 60 KHz, according to information in the RACH signaling.

18 Claims, 16 Drawing Sheets

(56) References Cited

FOREIGN PATENT DOCUMENTS

| | | | |
|---|---|---|---|
| WO | WO-2022/121826 | A1 | 6/2022 |
| WO | WO-2022/154524 | A1 | 7/2022 |

OTHER PUBLICATIONS

LG "Initial access aspects to support NR above 52.6 GHz", 3GPP R1-2105419, May 10-27, 2021 (Year: 2021).*

Intel "Discussion on initial access aspects for extending NR up to 71 GHz", 3GPP R1-2104894, May 19-27, 2021 (Year: 2021).*

Extended European Search Report for EP Appl. No. 21951230.8, dated Apr. 26, 2024 (11 pages).

Intel Corporation, "Discussion on initial access aspects for extending NR up to 71 GHz", 3GPP TSG RAN WG1 Meeting #105-e, R1-2104894, May 27, 2021, e-Meeting (18 pages).

"3rd Generation Partnership Project; Technical Specification Group Radio Access Network; NR; Physical channels and modulation (Release 16)", 3GPP TS 38.211 V16.6.0 (Jun. 2021), 3 pages.

LG Electronics, "Initial access aspects to support NR above 52.6 GHz", 3GPP TSG RAN WG1 #105-e, R1-2105419, May 27, 2021, e-Meeting (12 pages).

Notice of Reasons for Rejection for JP Appl. No. 2023-569643, dated Nov. 1, 2024 (with English translation, 11 pages).

Ericsson, "Initial Access Aspects" 3GPP TSG-RAN WG1 Meeting #104bis-e, Tdoc R1-2102788, Apr. 20, 2021, e-meeting (17 pages).

International Search Report and Written Opinion for PCT Appl. No. PCT/CN2021/108853, mailed Apr. 25, 2022 (8 pages).

Nokia et al., "Initial access aspects" 3GPP TSG RAN WG1 #104-bis-e, R1-2102558, Apr. 20, 2021, e- Meeting (22 pages).

First Office Action on CN Appl. No. 202180099019.4 dated Jul. 10, 2026 (20 pages with English translation).

* cited by examiner

300

| PRACH Config. Index | Preamble format | $n_{SFN} \bmod x = y$ | | Slot number | Starting symbol | Number of PRACH slots within a 60 kHZ slot | $N_t^{RA,slot}$, Number of time-domain PRACH occasions within a PRACH slot | $N_{dur}^{RA}$, PRACH duration |
|---|---|---|---|---|---|---|---|---|
| | | $x$ | $y$ | | | | | |
| **12** | A1 | 1 | 0 | 19, 39 | 7 | 1 | **3** | **2** |
| **89** | B1 | 16 | 1 | 4, 9, 14, 19, 24, 29, 34, 39 | 2 | 2 | **6** | **2** |
| 98 | B1 | 1 | 0 | 9, 19, 29, 39 | 8 | 2 | 3 | 2 |
| 228 | A2/B2 | 1 | 0 | 9, 19, 29, 39 | 6 | 1 | 2 | 4 |

FIG. 3

*PRACHConfig.Index* =89

740

SYSTEMS AND METHODS FOR INDICATION OF A RANDOM ACCESS CHANNEL OCCASION

CROSS-REFERENCE TO RELATED APPLICATION

This application claims the benefit of priority under 35 U.S.C. § 120 as a continuation of PCT Patent Application No. PCT/CN2021/108853, filed on Jul. 28, 2021, the disclosure of which is incorporated herein by reference in its entirety.

TECHNICAL FIELD

The disclosure relates generally to wireless communications, including but not limited to systems and methods for indicating a random access channel (RACH) occasion during a RACH process.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a RACH signaling from a wireless communication node. The wireless communication device may determine a candidate starting symbol for a subcarrier spacing (SCS) higher than 120 kiloHertz (KHz) or 60 KHz, according to information in the RACH signaling.

In some embodiments, the wireless communication device may determine the candidate starting symbol, according to a SCS of 120 KHz or 60 KHz. In some embodiments, the wireless communication device may receive, from the wireless communication node, a signaling that indicates a RACH occasion (RO) position set, the RO position set identifying one candidate RO position set. In some embodiments, the wireless communication device may receive, from the wireless communication node, a signaling that indicates a RO position set, the RO position set identifying at least two candidate RO position sets. In some embodiments, the signaling may comprise a radio resource configuration (RRC) signaling, a medium access control control element (MAC CE) signaling, or a downlink control information (DCI) signaling. In some embodiments, the wireless communication device may determine a RO position set according to a default configuration. The RO position set may identify one candidate RO position set.

In some embodiments, the wireless communication device may determine a RO position set according to a default configuration. The RO position set may identify at least two candidate RO position sets. In some embodiments, the default configuration may include a parameter having a first value that indicates that the RO position set includes one candidate RO position set, a second value that indicates that the RO position set includes two candidate RO position sets, a third value that indicates that the RO position set includes three candidate RO position sets, a fourth value that indicates that the RO position set includes four candidate RO position sets, a fifth value that indicates that the RO position set includes five candidate RO position sets, a sixth value that indicates that the RO position set includes six candidate RO position sets, a seventh value that indicates that the RO position set includes seven candidate RO position sets, or an eighth value that indicates that the RO position set includes eight candidate RO position sets.

In some embodiments, a symbol position (l) may be a function of at least one of:

$$l_0,\ n_t^{RA},\ N_{dur}^{RA},\ n_{slot}^{RA},\ \text{or}\ \Delta l.$$

In some embodiments, $l_0$ may be a candidate starting symbol with a SCS of 120 KHz or 60 KHz. In some embodiments, $$n_t^{RA}$$

may be a RO within a slot with the SCS of 120 KHz or 60 KHz, numbered in increasing order from 0 to $$N_t^{RA,slot} - 1$$

within the slot with the SCS of 120 KHz or 60 KHz in a candidate RO position set, where $$M_t^{RA,slot}$$

is a number of ROs in one candidate RO position set within the slot with the SCS of 120 KHz or 60 KHz. In some embodiments, $$N_{dur}^{RA}$$

may be a number of symbols of a RO duration or physical RACH (PRACH) duration. In some embodiments, $$n_{slot}^{RA}$$

may be a number of PRACH slots within a 60 KHz or 120 KHz slot per candidate RO position set, or a number of 120 KHz or 60 Khz slots in the 60 KHz or 120 KHz slot. In some embodiments, Δl may be a value corresponding to a candidate RO position set offset of a symbol boundary of the SCS of 120 KHz or 60 KHz. In some embodiments, Δl may refer to a symbol level offset between the candidate starting symbol and a starting symbol of the candidate RO position set. In some embodiments, the function may include at least one of:

$$n_t^{RA} N_{dur}^{RA} * 2^{\mu-3} (\mu > 3),\ 14 n_{slot}^{RA} * 2^{\mu-3} (\mu > 3), \text{ or } \mu.$$

In some embodiments, $$n_t^{RA} N_{dur}^{RA} * 2^{\mu-3} (\mu > 3)$$

may refer to symbols of one or more ROs in the slot with the SCS of 120 KHz or 60 KHz. In some embodiments, $$14 n_{slot}^{RA} * 2^{\mu-3}\ (\mu > 3)$$

may refer to symbols of the slot with the SCS of 120 KHz or 60 KHz. In some embodiments, y can be a PRACH SCS. In some embodiments, the symbol position (l) may be determined by $$l = l_0 + n_t^{RA} N_{dur}^{RA} * 2^{\mu-3} + \Delta l + 14 n_{slot}^{RA} * 2^{\mu-3} (\mu > 3),$$

$$l = l_0 * 2^{\mu-3} + n_t^{RA} N_{dur}^{RA} * 2^{\mu-3} + \Delta l + 14 n_{slot}^{RA} * 2^{\mu-3} (\mu > 3),$$

$$l = l_0 + n_t^{RA} N_{dur}^{RA} * 2^{\mu-3} + \Delta l * N_{dur}^{RA} + 14 n_{slot}^{RA} * 2^{\mu-3} (\mu > 3),$$

$$\text{or } l = l_0 * 2^{\mu-3} + n_t^{RA} N_{dur}^{RA} * 2^{\mu-3} + \Delta l * N_{dur}^{RA} + 14 n_{slot}^{RA} * 2^{\mu-3} (\mu > 3).$$

In some embodiments, Δl may include or correspond to x (e.g., Δl=x) for a x-th candidate RO position set. In some embodiments, for a plurality of candidate RO position sets, Δl may be a set of values corresponding to indices of the plurality of candidate RO position sets. In some embodiments, Δl may refer to a set of one or more symbol level offsets between the candidate starting symbol and a starting symbol of each candidate RO position set.

At least one aspect is directed to a system, method, apparatus, or a computer-readable medium. A wireless communication node (e.g., a ground terminal, a base station, a gNB, an eNB, or a serving node) may transmit/send a RACH signaling to a wireless communication device. The wireless communication node may cause the wireless communication device to determine a candidate starting symbol for a subcarrier spacing (SCS) higher than 120 kiloHertz (KHz) or 60 KHz, according to information in the RACH signaling.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates example configurations for a PRACH Config.Index, in accordance with some embodiments of the present disclosure;

DETAILED DESCRIPTION

1. Mobile Communication Technology and Environment

Figure 1:
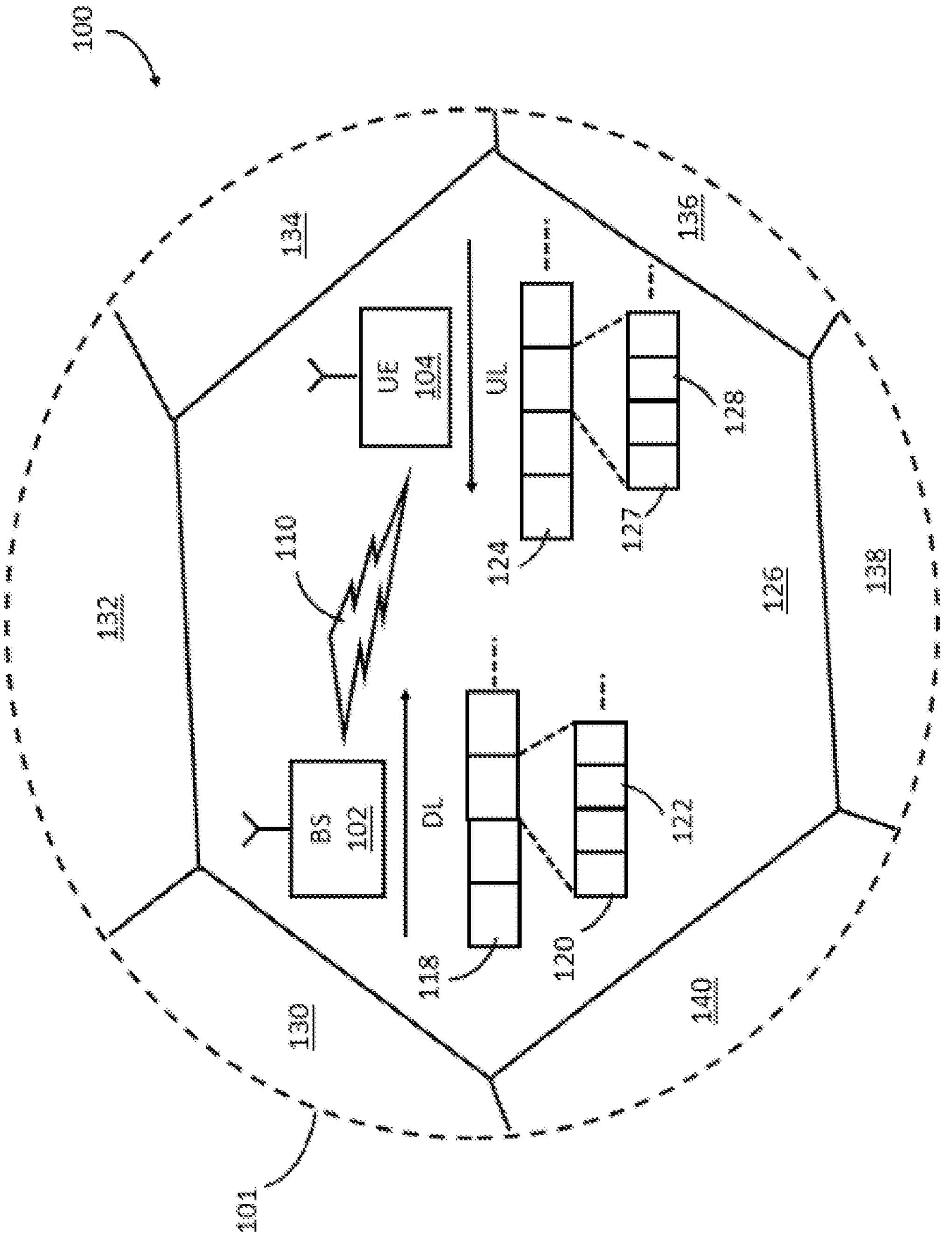
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
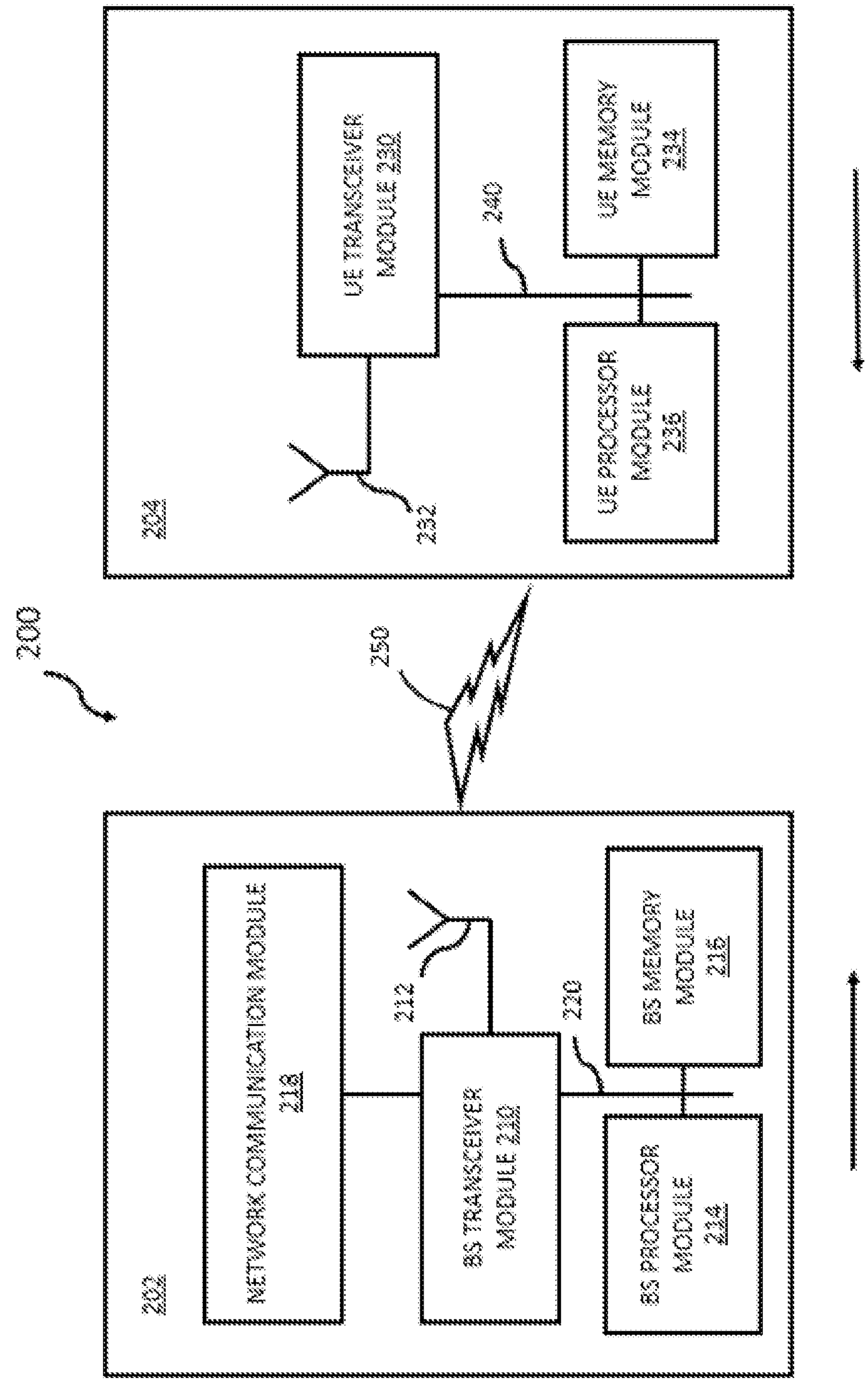
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Indication of a Random Access Channel Occasion

In certain systems with high carrier frequencies (e.g., 5G new radio (NR), Next Generation (NG) systems, 3GPP systems, and/or other systems), a channel bandwidth of said systems may increase (e.g., be wider). For instance, a channel bandwidth of a 5G NR system may be larger than a channel bandwidth of a Long Term Evolution (LTE) system (e.g., a 5G NR system can include/use higher carrier frequencies compared to a LTE system). Systems with higher carrier frequencies may use, include, and/or introduce a new/distinct subcarrier spacing. In addition, said systems (e.g., systems with higher carrier frequencies) may use, include, and/or introduce a gap (e.g., a time-instance/domain gap, such as a number of symbols). In some embodiments, one or more processes can use said gap, such as for (or to support/enable) a look before talk (LBT) process, a beam (e.g., direction) switching process, and/or a physical random access channel (PRACH) process (otherwise sometimes referred to as a random access channel (RACH) process). For instance, in a PRACH process, the gap can be inserted/introduced in between RACH occasions (RO). In some embodiments, at least one PRACH indicator and/or index (e.g., a PRACH Config.Index) can be used to configure one or more ROs. If a RACH process uses/supports/enables said gap (e.g., a gap with a length of Y symbol(s) is introduced in between ROs), the wireless communication device may determine/identify a position of at least one RO (e.g., across one or more PRACH slots) according to a value of a PRACH Config.Index (which may be referred as a configuration index or a PRACH/RACH configuration index). For instance, the wireless communication device may determine/identify a symbol (e.g., a position/location) of a first RO for a SCS higher than 120 kiloHertz (KHz) or 60 kHz.

Figure 4:
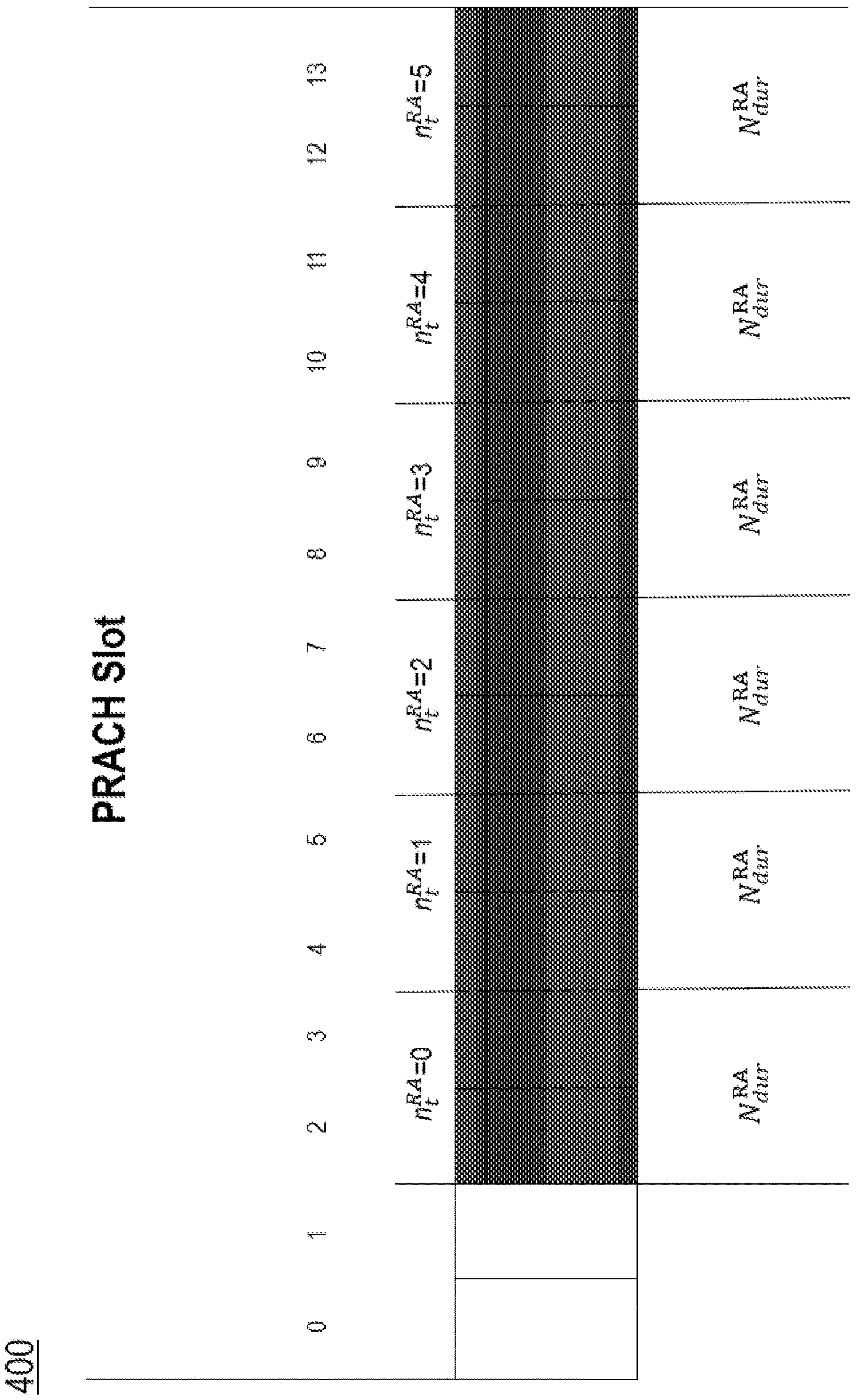
FIGS. 4-5 illustrate example configurations for a PRACH slot, in accordance with some embodiments of the present disclosure.

Certain systems (e.g., 5G NR systems, Next Generation (NG) systems, and/or other systems) may use at least one PRACH indicator and/or index (e.g., a PRACH Confg.Index) to configure one or more ROs. Referring now to FIG. 3, depicted is an embodiment of a configuration/table 300 for PRACH (e.g., having at least one PRACH Config. Index). According to FIG. 3, a value of a PRACH Config.Index may indicate/specify a starting symbol of a RO within a PRACH slot, a number of PRACH slots within a 60 kHz (or other frequencies) slot, a number of time-domain ROs within a PRACH slot, and/or a duration of a PRACH (e.g., a number of symbols per RO). Referring now to FIG. 4, depicted is a configuration 400 of an embodiment of a PRACH slot, according to a value of a PRACH Config.Index. As shown in FIG. 4, a PRACH Config.Index with a value of 89 may indicate/specify that a starting symbol has a value of two (e.g., an RO begins at the third symbol of the PRACH slot) and/or a PRACH duration has a value of two symbols (e.g., a duration of each RO is two symbols). In addition, a PRACH Config.Index with a value of 89 may indicate/specify that a PRACH slot includes six time-domain ROs (e.g., six time-domain ROs per PRACH slot), as shown in FIG. 4.

Figure 5:
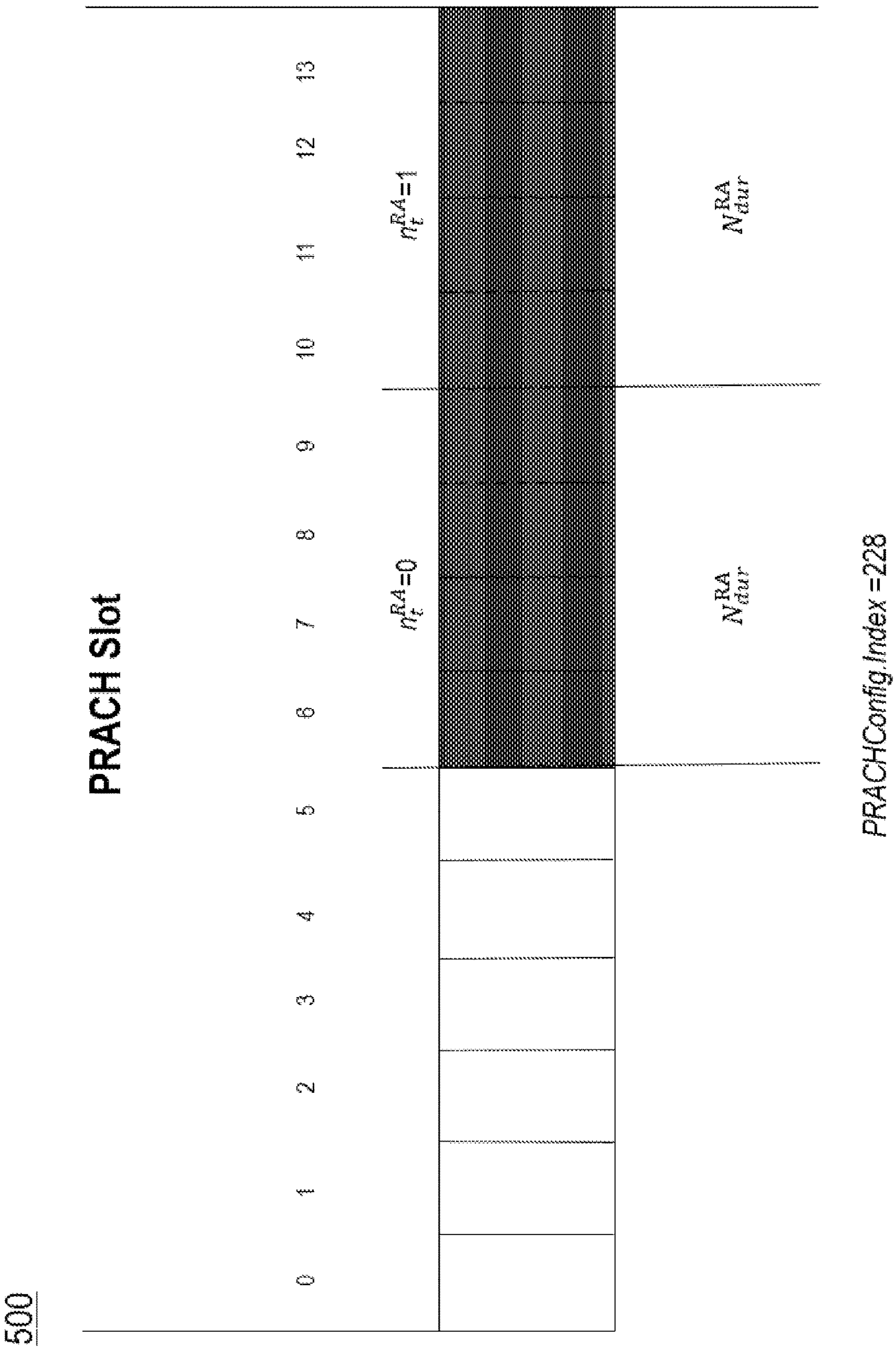

Referring now to FIG. 5, depicted is a configuration 500 of an embodiment of a PRACH slot, according to a value of a PRACH Config.Index. As shown in FIG. 5, a PRACH Config.Index with a value of 228 may specify that a starting symbol has a value of six (e.g., an RO begins at the seventh symbol of the PRACH slot), a PRACH duration is four symbols, and/or a PRACH slot includes two time-domain ROs. In some embodiments, one or more parameters of a higher layer signaling (e.g., RACH-ConfigCommon, RACH-ConfigDedicated, RACH-ConfigGeneric, and/or other parameters) may configure/determine the PRACH Config.Index (and/or other indices). In some embodiments, the higher layer signaling may comprise a radio resource configuration (RRC) signaling, a medium access control control element (MAC CE) signaling, and/or a downlink control information (DCI) signaling for configuring/determining one or more ROs. In some embodiments, one or more ROs (e.g., all ROs) can be located within a single PRACH slot. As such, an RO (of the one or more ROs) may not straddle, span, and/or extend across a PRACH slot boundary (e.g., a PRACH slot boundary between a first PRACH slot and a second PRACH slot) and/or into another PRACH slot (e.g., from a first PRACH slot into a second PRACH slot).

In some embodiments, at least one gap (e.g., a time instance, such as a gap with a length of one or two symbols, for instance) can be located/introduced within a PRACH pattern of a PRACH slot, such as between ROs. If at least one gap is located/introduced within the PRACH pattern/configuration (e.g., a PRACH pattern/configuration specified by the PRACH Config.Index), one or more ROs of the PRACH slot can be located/displaced outside of said PRACH slot (e.g., instead of being located within a same PRACH slot). If one or more ROs are displaced outside of said PRACH slot, the wireless communication device may reinterpret at least one of the parameters (e.g., a starting symbol) of table 300 in FIG. 3. Referring now to FIGS. 6A-6D and FIGS. 7A-7D, depicted are configurations of embodiments of one or more PRACH slots, according to a value of a PRACH Config.Index and/or a gap (e.g., a gap with a length of Y symbols). In some embodiments, a gap with a length of six symbols (e.g., for a SCS of 480 kHz) can be inserted/introduced between ROs when a PRACH Config.Index has a value of 89 (as seen in FIGS. 6A-6D). In some embodiments, a gap with a length of 12 symbols (e.g., for a SCS of 480 kHz) can be inserted between ROs when a PRACH Config.Index has a value of 228 (as seen in FIGS. 7A-7D). If said gap (e.g., with a length of six symbols and/or 12 symbols) is inserted between ROs, a starting symbol $$\left(\text{e.g., } n_t^{RA} = 0\right)$$

may be inconsistent with the starting symbol specified in table 300 (e.g., a starting symbol associated to the value of the PRACH Config.Index). As such, one or more ROs may be located/displaced across one or more PRACH slots (as seen in FIGS. 6A-6D and FIGS. 7A-7D). Therefore, a wireless communication device may determine a starting symbol for a SCS higher than 120 kHz and/or 60 KHz (e.g., according to the value of the PRACH Config.Index).

A. Configuration of PRACH Slots when a PRACH Config.Index=89

In some embodiments, a PRACH Config.Index may have a value of 89. According to FIG. 3, for example, if a PRACH Config.Index has a value of 89, a starting symbol of one or more ROs (e.g., one or more continuous ROs) of a PRACH slot (e.g., slot N) may include or correspond to two (e.g., a third symbol). For a SCS higher than 120 kHz (e.g., SCS=480 kHz as seen in FIGS. 6A-6D), one or more ROs can be located across one or more PRACH slots (e.g., instead of within a same PRACH slot). As such, a value of a starting symbol for a SCS higher than 120 kHz may be inconsistent with the value of the starting symbol specified in table 300, for example (e.g., a third symbol, according to a PRACH Config.Index of 89).

Figure 8:
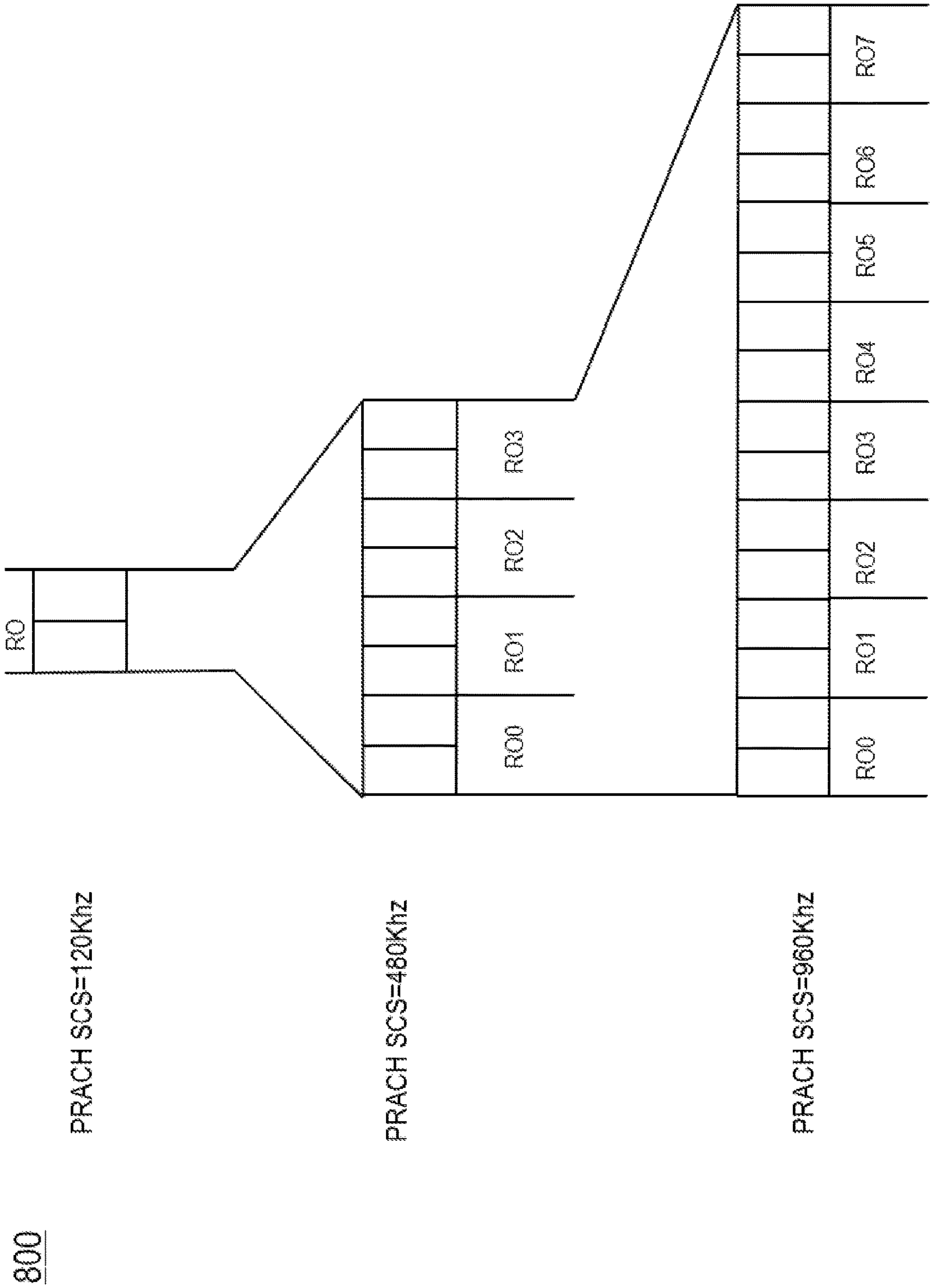
FIG. 8 illustrates example configurations of a correspondence between random access channel (RACH) occasions of a SCS with values of 120 kHz, 480 kHz, and 960 kHz, in accordance with some embodiments of the present disclosure.

In some embodiments, a PRACH pattern of a PRACH slot (e.g., a PRACH pattern/configuration specified by the PRACH Config.Index) can be described in terms of ROs. As seen in FIG. 8, each RO (e.g., RO with a duration of two symbols) of a SCS with a value of 120 kHz (e.g., SCS=120 kHz) may correspond to (or be located in one of) four candidate positions/locations (e.g., RO0, RO1, RO2, and/or RO3) of a SCS with a value of 480 kHz (e.g., SCS=480 kHz). In another example, each RO of a SCS with a value of 120 kHz may correspond to (or be located in one of) eight candidate positions/locations (e.g., RO0, RO1, RO2, RO3, RO4, RO5, RO6, and/or RO7) of a SCS with a value of 960 kHz. In some embodiments, an RO position set can identify, specify, and/or indicate one of a plurality of candidate RO position sets (e.g., ROx, such as RO0, RO1, RO2, and/or others). The plurality of candidate RO position sets may be within, include, and/or correspond to a 120 kHz slot, a 60 kHz slot, a system frame, and/or a time instance (e.g., 10 ms, 20 ms, 40 ms, 80 ms, and/or 160 ms).

Case 1: In some embodiments, a wireless communication device may determine a candidate starting symbol for a SCS higher than 120 kHz and/or 60 kHz. For instance, the wireless communication device may determine the candidate starting symbol includes or corresponds to a starting symbol for a SCS of 120 KHz or 60 KHz (e.g., a symbol index of the 120 kHz slot that aligns with one or more ROs of a higher SCS).

Figure 6A:
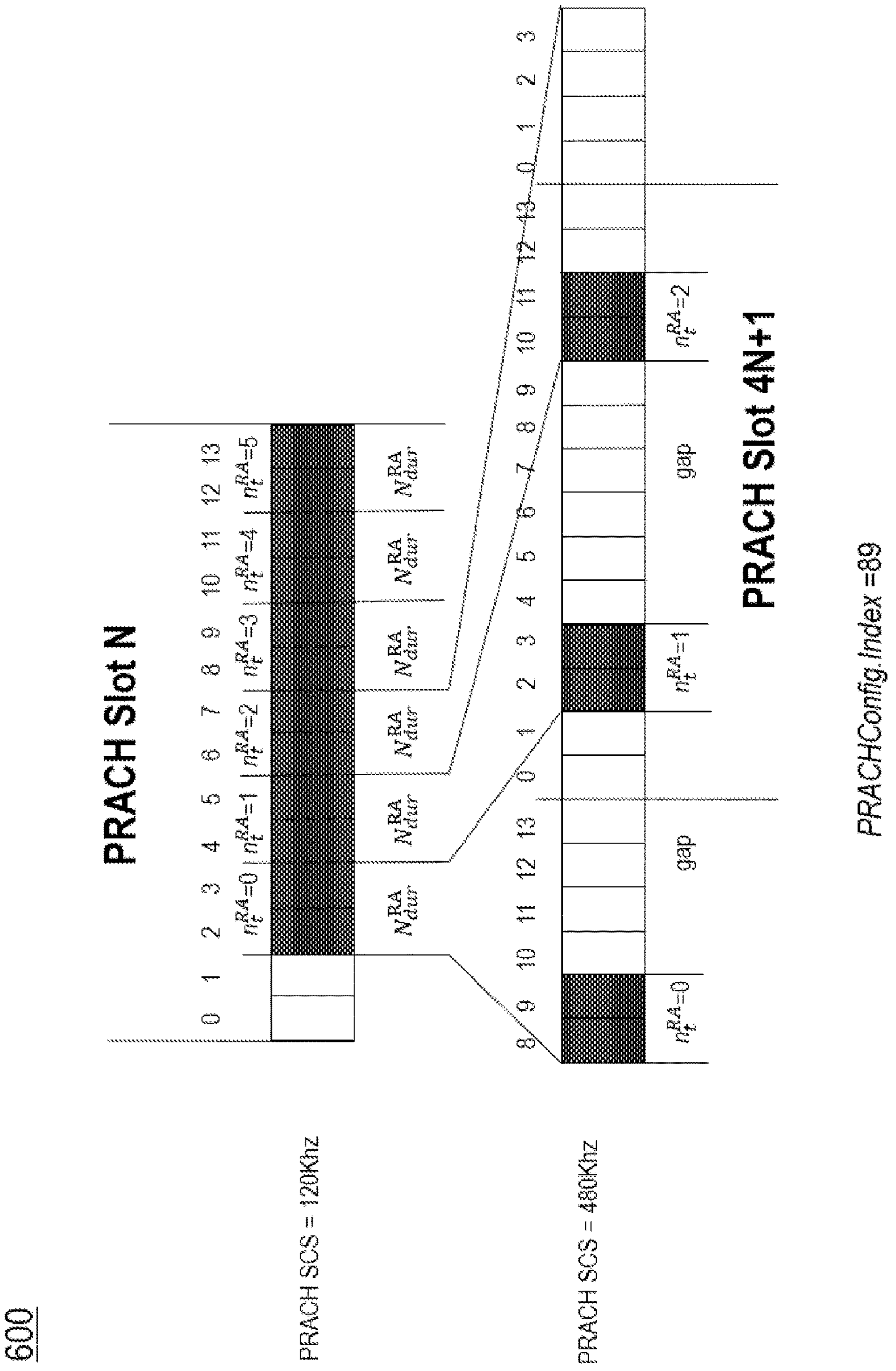
FIGS. 6A-6D illustrate example configurations for one or more PRACH slots with one or more gaps, in accordance with some embodiments of the present disclosure.
Figure 6B:
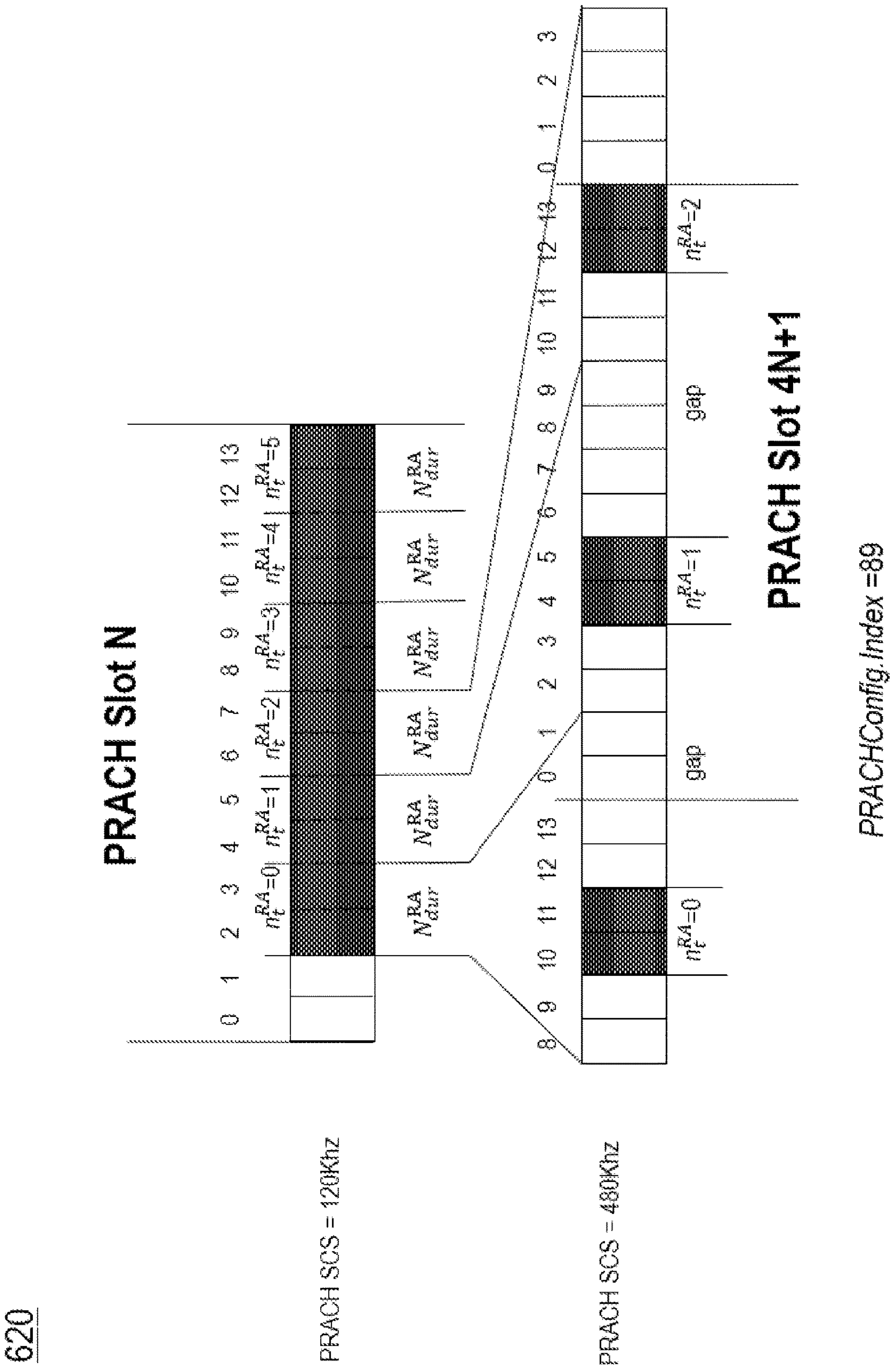
Figure 6C:
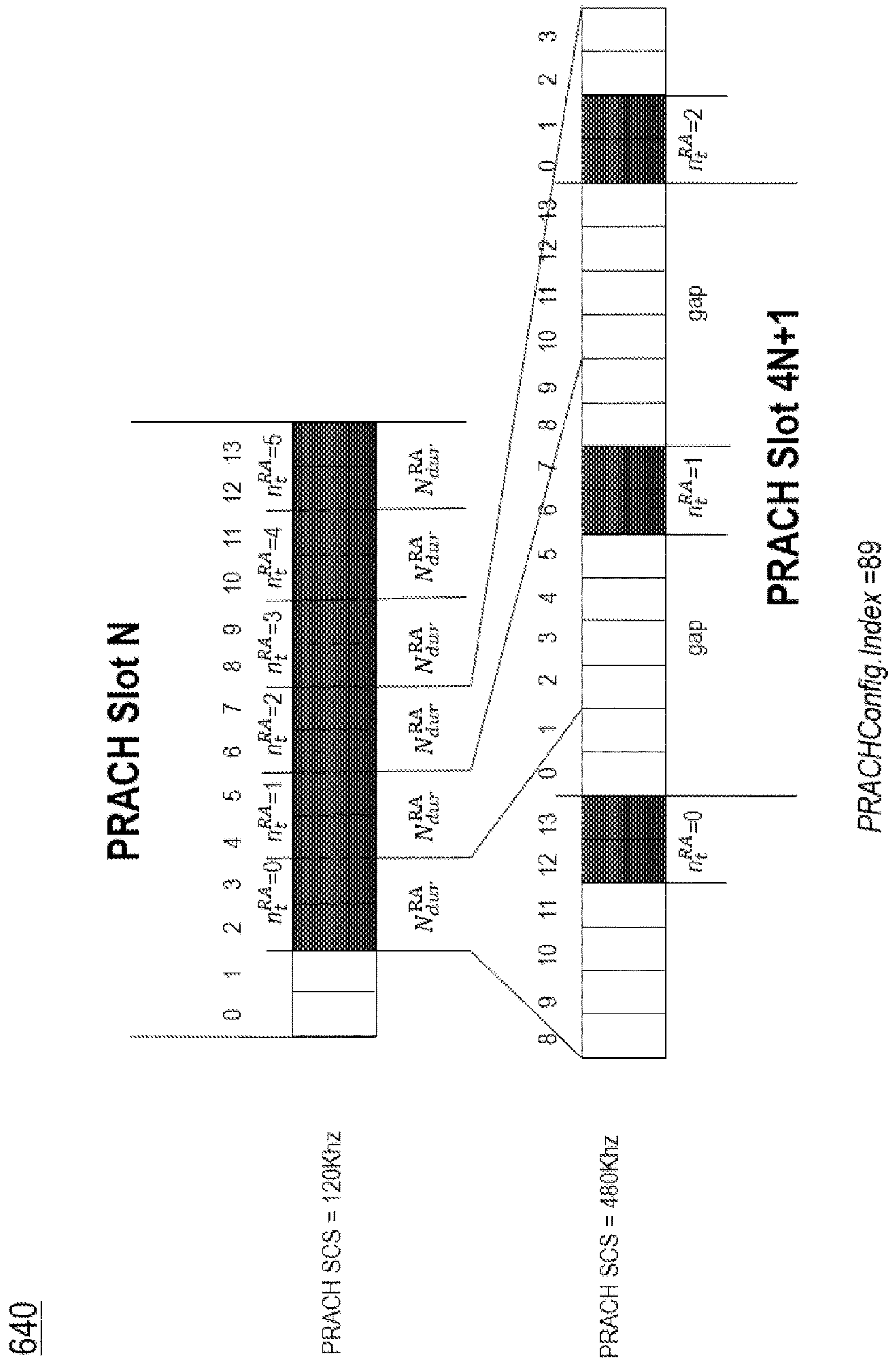
Figure 6D:
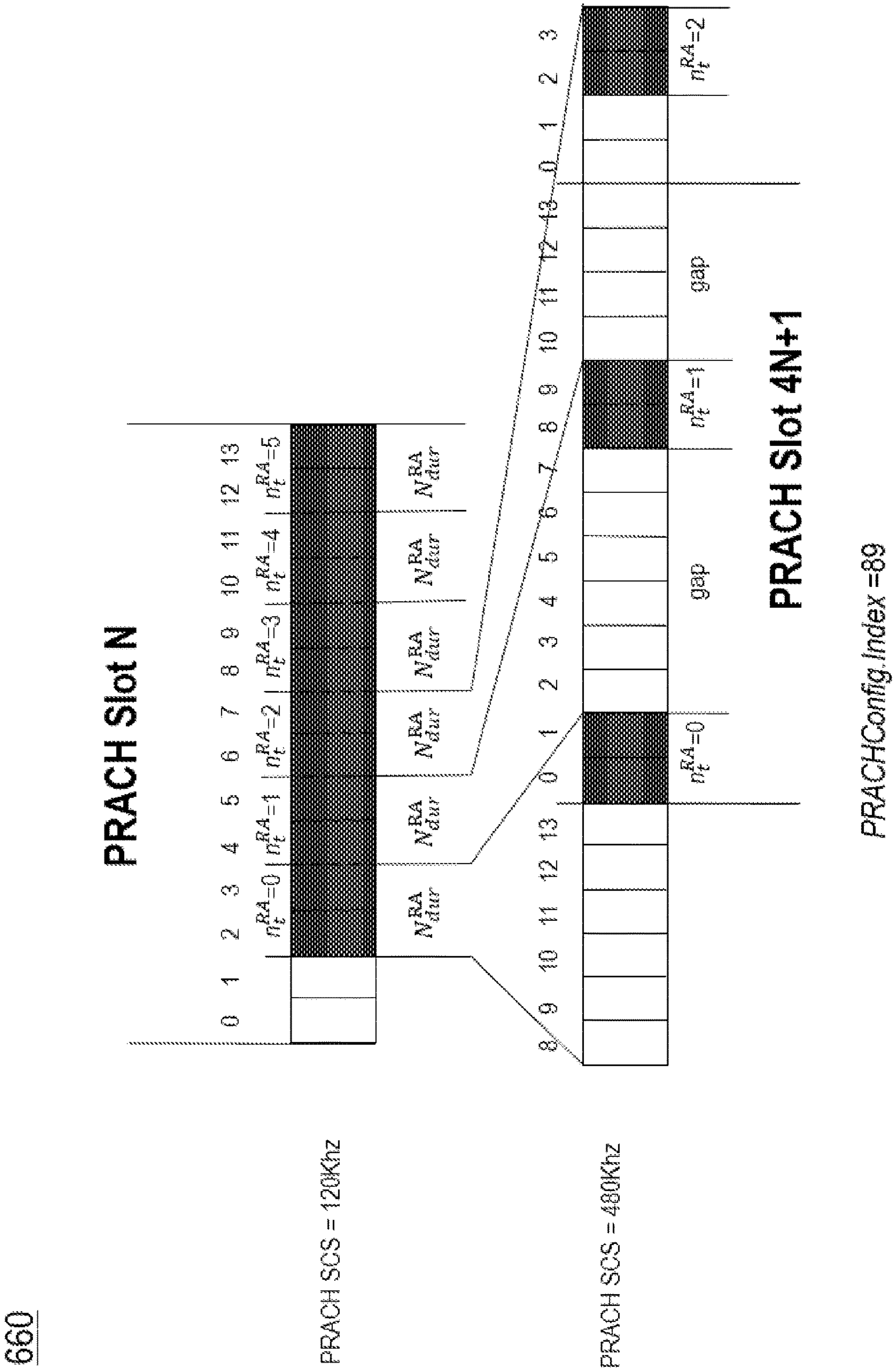

Case 1-1: In some embodiments, a wireless communication device may receive a signaling from the wireless communication node. The signaling may comprise at least one of: a radio resource configuration (RRC) signaling, a medium access control control element (MAC CE) signaling, a downlink control information (DCI) signaling, and/or other types of signaling. The signaling may indicate, specify, and/or provide a RO position set (e.g., a RO position set within, included, or corresponding to a 120 kHz slot, a 60 kHz slot, a system frame, and/or a time instance). The RO position set may include, identify, indicate, and/or specify one of a plurality of candidate RO position sets (e.g., RO0, RO1, RO2, RO3, and/or other candidate RO position sets). In FIG. 6A, for example, a first RO $$\left(\text{e.g., } n_t^{RA} = 0\right)$$

can be located in a candidate RO position set corresponding to RO0 (e.g., the candidate RO position set and/or RO0 correspond to 6 ROs with a same time interval for SCS=480 kHz in a 120 kHz slot). In FIG. 6B, for example, a first RO $$\left(\text{e.g., } n_t^{RA} = 0\right)$$

can be located in a candidate RO position set corresponding to RO1 (e.g., the candidate RO position set and RO1 correspond to 6 ROs with a same time interval for SCS=480 kHz in a 120 kHz slot). In FIG. 6C, for example, a first RO $(\text{e.g., } n_t^{RA} = 0)$ can be located in a candidate RO position set corresponding to RO2 (e.g., the candidate RO position set and RO2 correspond to 6 ROs with a same time interval for SCS=480 kHz in a 120 kHz slot). In FIG. 6D, for example, a first RO $(\text{e.g., } n_t^{RA} = 0)$ can be located in a candidate RO position set corresponding to RO3 (e.g., the candidate RO position set and RO3 correspond to 6 ROs with a same time interval for SCS=480 kHz in a 120 kHz slot). In some embodiments, the wireless communication device may determine a starting symbol for a SCS higher than 120 kHz and/or 60 kHz according to the received signaling (e.g., according to the RO position set specified by the signaling). For instance, the starting symbol for a SCS higher than 120 kHz and/or 60 kHz can be associated with (e.g., located within) a candidate RO positions specified in the received signaling.

Case 1-2: In some embodiments, a wireless communication device may receive a signaling from the wireless communication node. The signaling may comprise at least one of: a RRC signaling, a MAC CE signaling, a DCI signaling, and/or other types of signaling. The signaling may indicate, specify, and/or provide a RO position set. The RO position set may include, identify, indicate, and/or specify at least two candidate position sets. For example, the at least two candidate position sets for the RO may comprise {RO0, RO1}, {RO0, RO2}, {RO0, RO3}, {RO1, RO2}, {RO1, RO3}, {RO2, RO3}, {RO0, RO4}, {RO1, RO5}, {RO2, RO6}, {RO3, RO7}, and/or other combinations of at least two candidate position sets. In some embodiments, the wireless communication device may determine a starting symbol for a SCS higher than 120 kHz and/or 60 kHz according to the received signaling (e.g., according to the RO position set specified by the signaling). For instance, the starting symbol for a SCS higher than 120 kHz and/or 60 kHz can be associated with (e.g., located within) the at least two candidate RO positions sets.

Case 1-3: In some embodiments, a wireless communication device may determine a starting symbol of a first RO $(\text{e.g., } n_t^{RA} = 0)$ and/or a RO positon set for a SCS higher than 120 kHz and/or 60 kHz. For instance, the wireless communication device may determine a RO position set according to a default configuration (e.g., a default candidate RO position set or a default set of candidate RO position sets). The RO position set may identify and/or indicate a candidate position set (e.g., RO0, RO1, RO2, RO3, and/or other candidate RO position sets). In some embodiments, the RO position set and RO0, for example, may correspond to 6 ROs with a same time interval for SCS=480 kHz in a 120 kHz slot. In some embodiments, the wireless communication device may determine a starting symbol according to the default configuration (e.g., without additional signaling). For instance, the starting symbol (e.g., for a SCS higher than 120 kHz and/or 60 kHz) can be associated with (e.g., located within) a candidate position set.

Case 1-4: In some embodiments, a wireless communication device may determine a starting symbol of a first RO $(\text{e.g., } n_t^{RA} = 0)$ and/or a RO positon set for a SCS higher than 120 kHz and/or 60 kHz. For instance, the wireless communication device may determine a RO position set according to a default configuration (e.g., a default candidate RO position set or a default set of candidate RO position sets), without additional signaling. The RO position set may identify and/or indicate at least two candidate position sets. For example, the at least two candidate position sets may comprise {RO0, RO1}, {RO0, RO2}, {RO0, RO3}, {RO1, RO2}, {RO1, RO3}, {RO2, RO3}, {RO0, RO4}, {RO1, RO5}, {RO2, RO6}, {RO3, RO7}, and/or other combinations of at least two candidate RO position sets. In some embodiments, the wireless communication device may determine a candidate starting symbol according to the default configuration, without additional signaling. For instance, the candidate starting symbol (e.g., for a SCS higher than 120 kHz and/or 60 kHz) can be associated with (e.g., located within) the at least two candidate position sets.

In some embodiments, a default configuration can include at least one parameter (e.g., specified in a random access configuration table, DCI signaling, and/or RRC signaling). For SCS=480 kHz, the at least one parameter may have a first value, a second value, a third value, and/or a fourth value. For SCS=960 kHz, the at least one parameter may have a first value, a second value, a third value, a fourth value, a fifth value, a sixth value, a seventh value, and/or an eighth value. A first value may indicate that the RO position set includes one candidate RO position set (e.g., case 1-3, for example the RO set is RO1). A second value may indicate that the RO position set includes two candidate RO position sets (e.g., case 1-4). A third value may indicate that the RO position set includes three candidate RO position sets (e.g., case 1-4). A fourth value may indicate that the RO position set includes four candidate RO position sets. A fifth value may indicate that the RO position set includes five candidate RO position sets. A sixth value may indicate that the RO position set includes six candidate RO position sets. A seventh value may indicate that the RO position set includes seven candidate RO position sets. An eighth value may indicate that the RO position set includes eight candidate RO position sets (e.g., {RO0, RO1, RO2, RO3, RO4, RO5, RO6, RO7}).

B. Configuration of PRACH Slots when a PRACH Config-.Index=228

In some embodiments, a PRACH Config.Index may have a value of 228. According to FIG. 3, for example, if a PRACH Config.Index has a value of 228, a starting symbol of one or more ROs (e.g., one or more continuous ROs) of a PRACH slot (e.g., slot N) may include or correspond to six (e.g., a seventh symbol, as shown in FIG. 5). For a SCS higher than 120 kHz (e.g., SCS=480 kHz as seen in FIGS.

7A-7D), one or more ROs can be located across one or more PRACH slots (e.g., instead of within a same PRACH slot). As such, a value of a starting symbol for a SCS higher than 120 kHz may be inconsistent with the value of the starting symbol specified in table 300, for example (e.g., a seventh symbol, according to a PRACH Config.Index of 228). Therefore, a wireless communication device may determine a starting symbol for a SCS higher than 120 kHz and/or 60 KHz (e.g., according to a PRACH Config.Index).

Case 1: In some embodiments, a wireless communication device may determine a starting symbol and/or RO position set for a SCS higher than 120 kHz and/or 60 kHz. For instance, the wireless communication device may determine the starting symbol includes or corresponds to a starting symbol of a first RO and/or a candidate RO position set (e.g., a candidate RO position set within, included, or corresponding to a 120 kHz slot, a 60 kHz slot, a system frame, and/or a time instance) for a SCS of 120 KHz or 60 KHz (e.g., a symbol index of the 120 kHz slot that aligns with one or more ROs of a higher SCS).

Figure 7A:
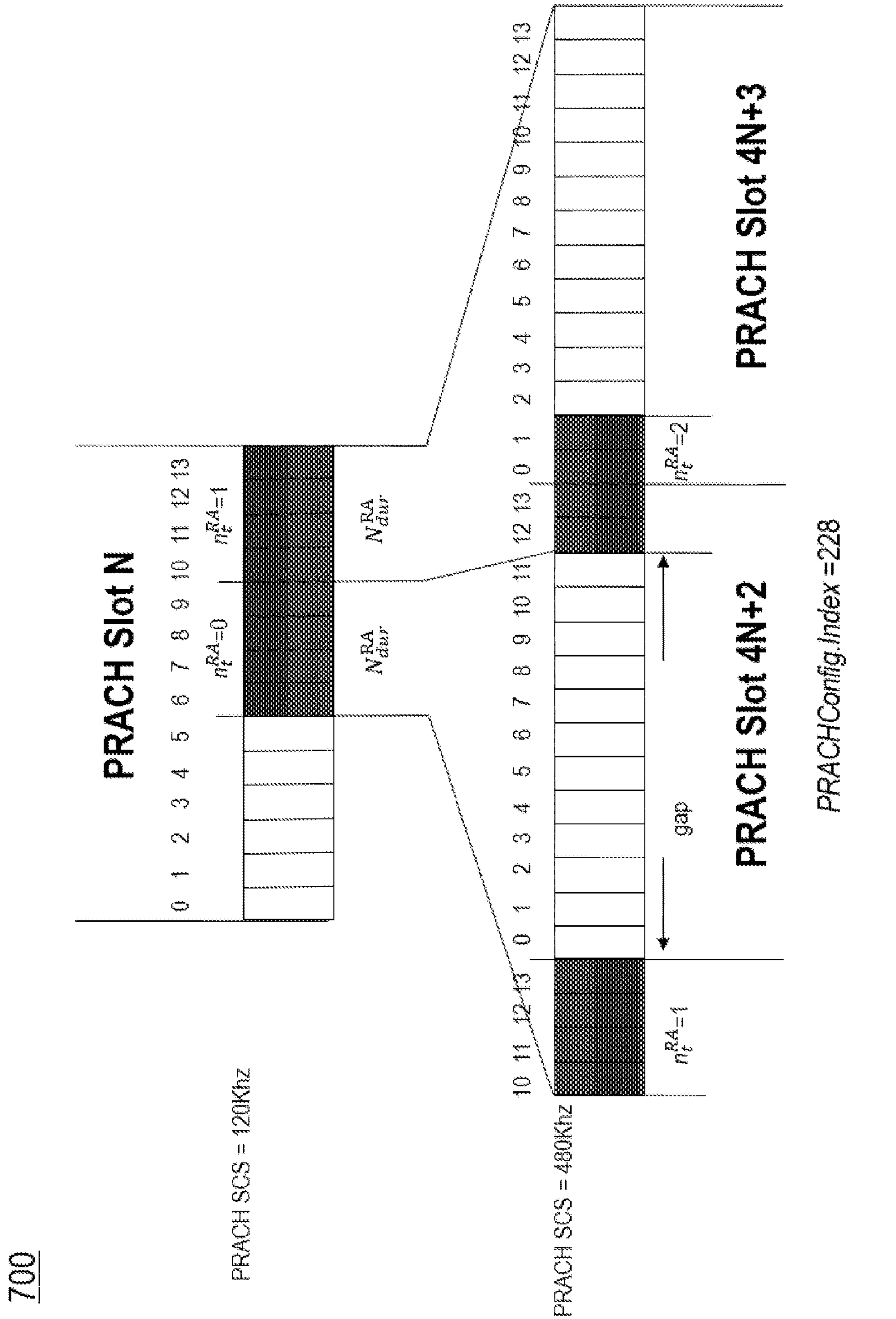
FIGS. 7A-7D illustrate example configurations for one or more PRACH slots with one or more gaps, in accordance with some embodiments of the present disclosure.
Figure 7B:
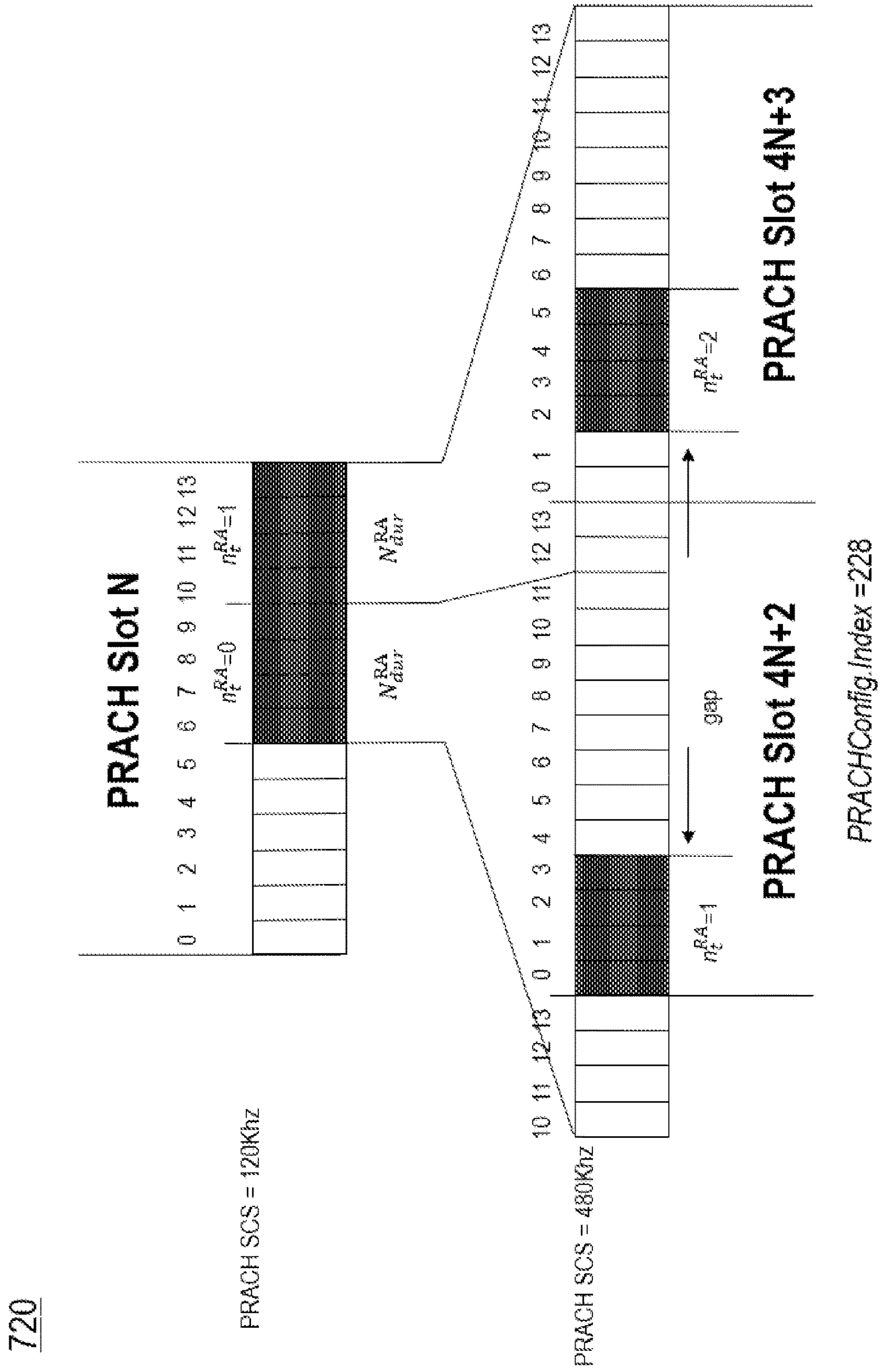
Figure 7C:
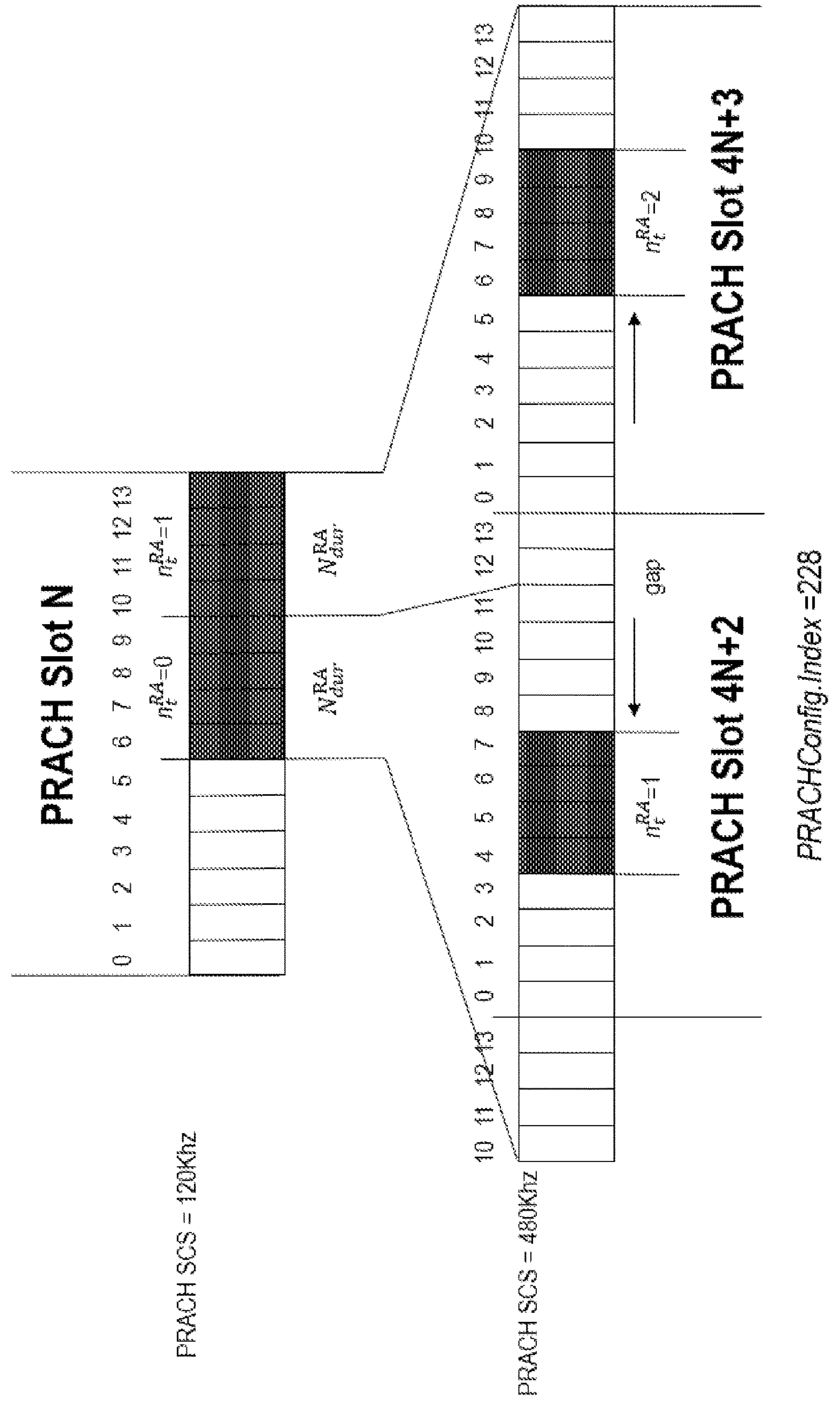
Figure 7D:
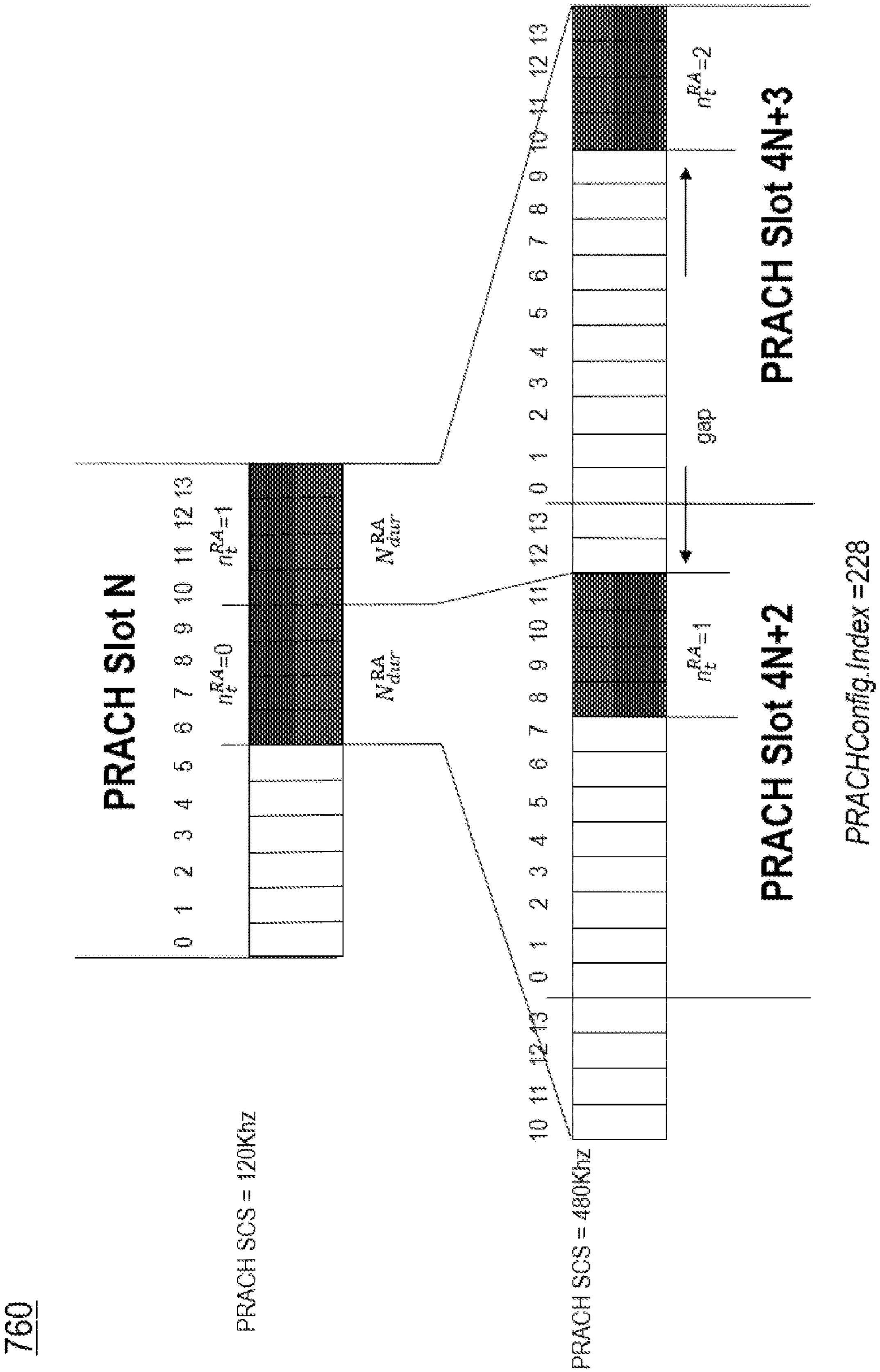

Case 1-1: In some embodiments, a wireless communication device may receive a signaling from the wireless communication node. The signaling may comprise at least one of: RRC signaling, a MAC CE signaling, a DCI signaling, and/or other types of signaling. The signaling may indicate, specify, and/or provide a RO position set. The RO position set may include, identify, indicate, and/or specify one candidate RO position set (e.g., RO0, RO1, RO2, RO3, and/or other candidate RO positions). In FIG. 7A, for example, a first RO $$\left(\text{e.g., } n_t^{RA} = 0\right)$$

can be located in a candidate RO position set corresponding to RO0 (e.g., the candidate RO position set and RO0 correspond to 2 ROs for SCS=480 kHz in a 120 kHz slot). In FIG. 7B, for example, a first RO $$\left(\text{e.g., } n_t^{RA} = 0\right)$$

can be located in a candidate RO position set corresponding to RO1 (e.g., the candidate RO position set and RO1 correspond to 2 ROs for SCS=480 kHz in a 120 kHz slot). In FIG. 7C, for example, a first RO $$\left(\text{e.g., } n_t^{RA} = 0\right)$$

can be located in a candidate RO position set corresponding to RO2 (e.g., the candidate RO position set and RO2 correspond to 2 ROs for SCS=480 kHz in a 120 kHz slot). In FIG. 7D, for example, a first RO $$\left(\text{e.g., } n_t^{RA} = 0\right)$$

can be located in a candidate RO position set corresponding to RO3 (e.g., the candidate RO position set and RO3 correspond to 2 ROs for SCS=480 kHz in a 120 kHz slot). In some embodiments, the wireless communication device may determine a candidate starting symbol for a SCS higher than 120 kHz and/or 60 kHz according to the received signaling (e.g., according to the RO position set specified by the signaling). For instance, the candidate starting symbol for a SCS higher than 120 kHz and/or 60 kHz can be associated with (e.g., located within) one candidate RO position set specified in the received signaling.

Case 1-2: In some embodiments, a wireless communication device may receive a signaling from the wireless communication node. The signaling may comprise at least one of: a RRC signaling, a MAC CE signaling, a DCI signaling, and/or other types of signaling. The signaling may indicate, specify, and/or provide a RO position set. The RO position set may include, identify, indicate, and/or specify at least two candidate position sets. For example, the at least two candidate position sets may comprise {RO0, RO1}, {RO0, RO2}, {RO0, RO3}, {RO1, RO2}, {RO1, RO3}, {RO2, RO3}, {RO0, RO4}, {RO1, RO5}, {RO2, RO6}, {RO3, RO7}, and/or other combinations of at least two candidate RO position sets. In some embodiments, the wireless communication device may determine a candidate starting symbol for a SCS higher than 120 kHz and/or 60 kHz according to the received signaling (e.g., according to the RO position set specified by the signaling). For instance, the candidate starting symbol for a SCS higher than 120 kHz and/or 60 kHz can be associated with (e.g., located within) the at least two candidate position sets.

Case 1-3: In some embodiments, a wireless communication device may determine a starting symbol of a first RO $$\left(\text{e.g., } n_t^{RA} = 0\right),$$

a candidate RO position set, and/or other ROs for a SCS higher than 120 kHz and/or 60 kHz. For instance, the wireless communication device may determine a RO position set according to (or based on) a default configuration (e.g., a default candidate RO position set or a default set of candidate RO position sets). The RO position set may identify and/or indicate one of candidate position set (e.g., RO0, RO1, RO2, RO3, and/or other candidate RO position set). In some embodiments, the wireless communication device may determine a starting symbol for an RO and/or a candidate RO position set according to the default configuration (e.g., without additional signaling). For instance, the starting symbol of an RO and/or a candidate RO position set (e.g., for a SCS higher than 120 kHz and/or 60 kHz) can be associated with (e.g., located within) a candidate position set.

Case 1-4: In some embodiments, a wireless communication device may determine a starting symbol of a first RO $$\left(\text{e.g., } n_t^{RA} = 0\right),$$

a candidate RO position set, and/or other ROs for a SCS higher than 120 kHz and/or 60 kHz. For instance, the wireless communication device may determine a RO position set according to a default configuration (e.g., a default candidate RO position set and/or a default set of candidate RO position sets). The RO position set may identify and/or indicate at least two candidate position sets. For example, the at least two candidate position set may comprise {RO0, RO1}, {RO0, RO2}, {RO0, RO3}, {RO1, RO2}, {RO1, RO3}, {RO2, RO3}, {RO0, RO4}, {RO1, RO5}, {RO2, RO6}, {RO3, RO7}, and/or other combinations of at least two candidate RO position sets. In some embodiments, the wireless communication device may determine a starting symbol according to the default configuration (e.g., according to the RO position set), without additional signaling. For instance, the starting symbol (e.g., for a SCS higher than 120 kHz and/or 60 kHz) can be associated with (e.g., located within) the at least two candidate position sets.

In some embodiments, a default configuration can include at least one parameter (e.g., specified in a random access configuration table, DCI signaling, and/or RRC signaling). For SCS=480 kHz, the at least one parameter may have a first value, a second value, a third value, and/or a fourth value. For SCS=960 kHz, the at least one parameter may have a first value, a second value, a third value, a fourth value, a fifth value, a sixth value, a seventh value, and/or an eighth value. A first value may indicate that the RO position set includes one candidate RO position set (e.g., case 1-3). A second value may indicate that the RO position set includes two candidate RO position sets (e.g., case 1-4), and/or four candidate RO positions. For SCS=480 kHz, the four RO position sets may include or correspond to RO0, RO1, RO2, and/or RO3. For SCS=960 kHz, the four RO position sets may include or correspond to RO0, RO1, RO2, RO3, RO4, RO5, RO6, RO7 (e.g., {RO0, RO1, RO2, RO3} and/or other combinations of four candidate RO position sets). A third value may indicate that the RO position set includes three candidate RO position sets. For SCS=480 kHz, the three candidate RO position sets may include or correspond to RO0, RO1, RO2, and/or RO3 (e.g., {RO0, RO1, RO2} and/or other combinations of three candidate RO position sets). For SCS=960 kHz, the three candidate RO position sets may include or correspond to RO0, RO1, RO2, RO3, RO4, RO5, RO6, and/or RO7 (e.g., {RO0, RO1, RO2} and/or other combinations of three candidate RO position sets). A fourth value may indicate that the RO position set includes four candidate RO position sets. For SCS=480 kHz, the four candidate RO position sets may include or correspond to RO0, RO1, RO2, and/or RO3. For SCS=960 kHz, the four candidate RO position sets may include or correspond to RO0, RO1, RO2, RO3, RO4, RO5, RO6, and/or RO7 (e.g., {RO0, RO1, RO2, RO3} and/or other combinations of four candidate RO position sets). A fifth value may indicate that the RO position set includes five candidate RO position sets. For SCS=960 kHz, the five RO position sets may include or correspond to RO0, RO1, RO2, RO3, RO4, RO5, RO6, and/or RO7. A sixth value may indicate that the RO position set includes six candidate RO position sets. For SCS=960 kHz, the six candidate RO position sets may include or correspond to RO0, RO1, RO2, RO3, RO4, RO5, RO6, and/or RO7. A seventh value may indicate that the RO position set includes seven candidate RO position sets. For SCS=960 kHz, the seven candidate RO position sets may include or correspond to RO0, RO1, RO2, RO3, RO4, RO5, RO6, and/or RO7. An eighth value may indicate that the RO position set includes eight candidate RO position sets. For SCS=960 kHz, the eight RO position sets may include or correspond to RO0, RO1, RO2, RO3, RO4, RO5, RO6, and/or RO7.

In some embodiments (e.g., case 1-1, case 1-2, case 1-3, and/or case 1-4), a symbol position (l) can be determined according to (or based on) a function of various elements, such as the following expression:

$$l = l_0 + n_t^{RA} N_{dur}^{RA} * 2^{\mu-3} + \Delta l + 14 n_{slot}^{RA} * 2^{\mu-3} (\mu > 3),$$

$$l = l_0 * 2^{\mu-3} + n_t^{RA} N_{dur}^{RA} * 2^{\mu-3} + \Delta l + 14 n_{slot}^{RA} * 2^{\mu-3} (\mu > 3),$$

$$l = l_0 + n_t^{RA} N_{dur}^{RA} * 2^{\mu-3} + \Delta l * N_{dur}^{RA} + 14 n_{slot}^{RA} * 2^{\mu-3} (\mu > 3), \text{ or}$$

$$l = l_0 * 2^{\mu-3} + n_t^{RA} N_{dur}^{RA} * 2^{\mu-3} + \Delta l * N_{dur}^{RA} + 14 n_{slot}^{RA} * 2^{\mu-3} (\mu > 3)$$

In some embodiments, $l_0$ may indicate, specify, and/or provide a candidate starting symbol for a PRACH slot with a SCS of 120 KHz and/or 60 KHz. In some embodiments, $$n_t^{RA}$$

may indicate, specify, and/or provide a RO within the PRACH slot with the SCS of 120 KHz and/or 60 KHz. The $$n_t^{RA}$$

can be numbered in increasing order from 0 to $$N_t^{RA,slot} - 1$$

within the PRACH slot with the SCS of 120 KHz and/or 60 KHz. In some embodiments, $$N_t^{RA,slot}$$

may indicate and/or specify a number of ROs within the PRACH slot with the SCS of 120 KHz and/or 60 KHz for $L_{RA} \in \{139,571,1151\}$ and fixed to 1 for $L_{RA}$=839. In some embodiments, $$N_{dur}^{RA}$$

may indicate and/or specify a number of symbols of a RO duration and/or a PRACH duration. In some embodiments, $$n_{slot}^{RA}$$

may indicate and/or specify a number of PRACH slots within a 60 KHz and/or 120 KHz slot per RO position set (e.g., RO1), and/or a number of 120 KHz or 60 KHz slots in the 60 KHz or 120 Khz slot.

In some embodiments, Δl may indicate a value corresponding to an offset of a symbol boundary of a SCS of the 120 KHz and/or 60 KHz and/or a starting symbol for a PRACH slot with a SCS of 120 KHz and/or 60 KHz. For a x-th position set, Δl=x. For instance, if a RO position set='RO0', Δl={0}. In one example, if a RO position set='RO1', Δl={1}. In another example, if a RO position set='RO2', Δl={2}. In some embodiments (e.g., case 1-3 and/or case 1-4), if a RO position set includes ROx, ROy, . . . , ROz (e.g., RO position set={ROx, ROy, . . . , ROz}, Δl may include or correspond to x, y, . . . , z (e.g., Δl={x,y, . . . , z}). In some embodiments, x,y, . . . , z can be integer values (e.g., 0, 1, 2, . . . ). In one example, if a RO position set={RO0, RO1}, Δl=(0,1). In one example, if a RO position set={RO0, RO2}, Δl=(0,2). In one example, if a RO position set={RO0, RO3}, Δl=(0,3). In one example, if a RO position set={RO1, RO2}, Δl={1,2}. In one example, if a RO position set={RO1, RO3}, Δl={1,3}. In one example, if a RO position set={RO2, RO3}, Δl={2,3}. In one example, if a RO position set={RO0, RO4}, Δl={0,4}. In one example, if a RO position set={RO0, RO5}, Δl={0,5}. In one example, if a RO position set={RO0, RO6}, Δl={0,6}. In one example, if a RO position set={RO3, RO7}, Δl={3, 7}. In various embodiments, the symbol position (l) can be determined according to a function of any one or more of the foregoing elements/components.

Figure 9:
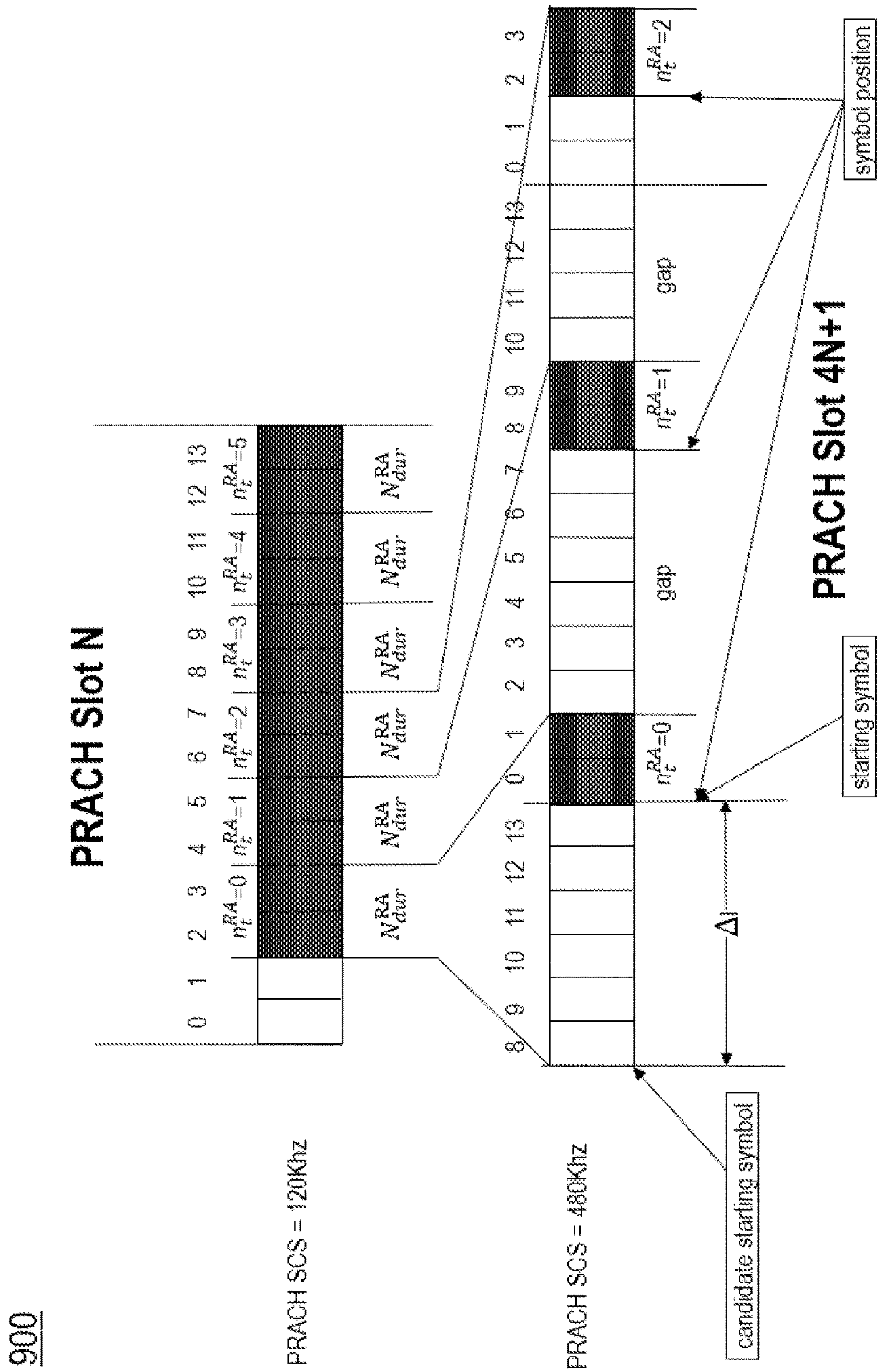
FIG. 9 illustrates example configurations for one or more PRACH slots with one or more gaps, in accordance with some embodiments of the present disclosure.

Referring now to FIG. 9, depicted is a configuration 900 of an embodiment with one or more PRACH slots, according to a value of a PRACH Config.Index and/or a gap (e.g., a gap with a length of Y symbols). FIG. 9 illustrates the relationship/association between a starting symbol (e.g., determined by a wireless communication device), a symbol position (l), and/or a candidate starting symbol ($l_0$). In some embodiments, the symbol position can be a function of at least the candidate starting symbol. In some embodiments, the starting symbol can be associated with (or correspond to) a candidate RO. For instance, the starting symbol may indicate, specify, and/or provide a position of the starting symbol of a candidate RO. In some embodiments, the symbol position may be associated with a RO position set (e.g., a set of one or more ROs). For instance, the symbol position may indicate, specify, and/or provide a position of a symbol of one or more candidate RO position set(s).

C. Indication of a Random Access Channel Occasion

Figure 10:
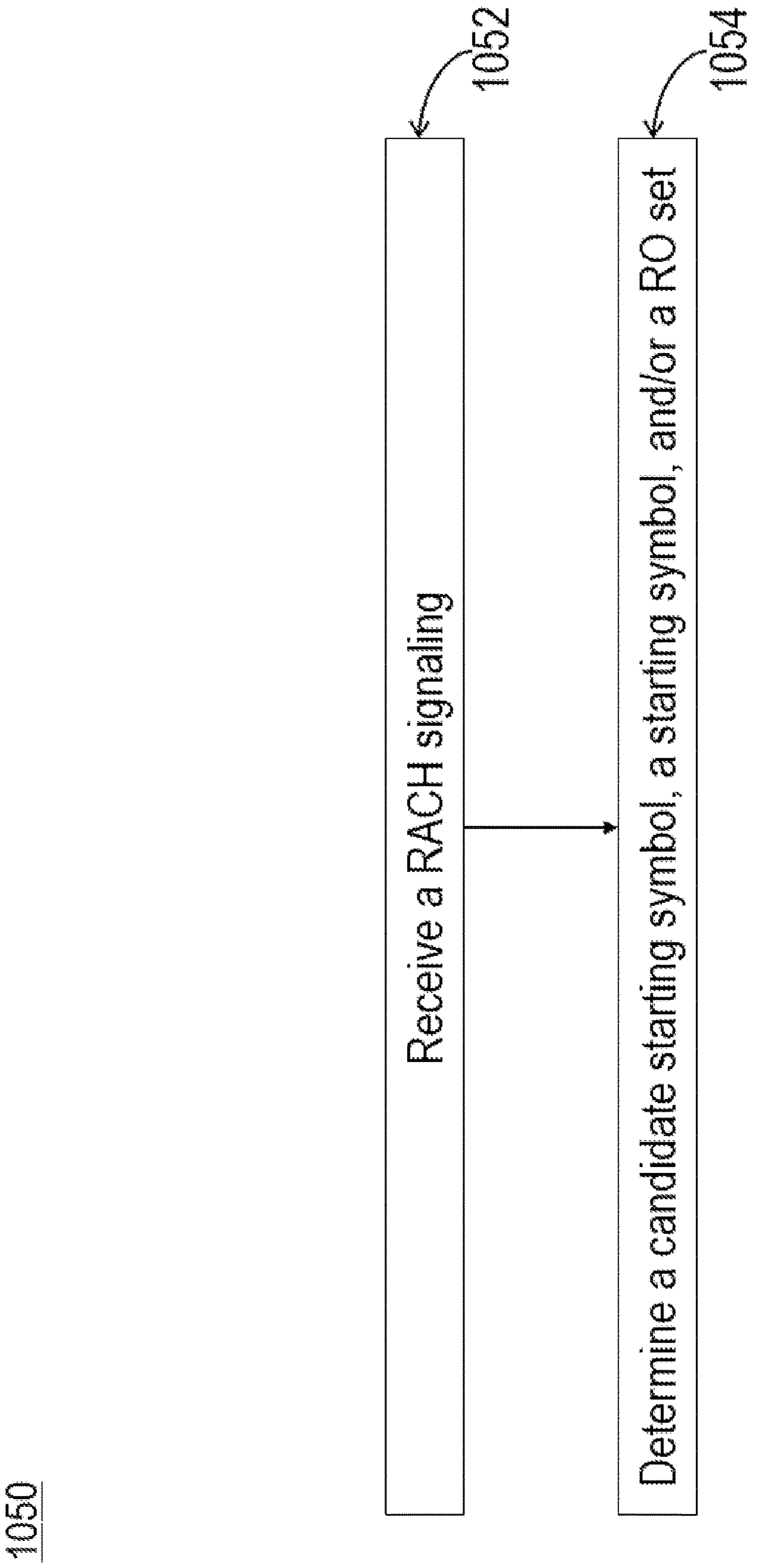
FIG. 10 illustrates a flow diagram of an example method for indicating a RACH occasion, in accordance with an embodiment of the present disclosure.

FIG. 10 illustrates a flow diagram of a method 1050 for indicating an RO or an RO position set. The method 1050 may be implemented using any of the components and devices detailed herein in conjunction with FIGS. 1-9. In overview, the method 1050 may include receiving a RACH signaling (1052). The method 1050 may include determining at least one of: a candidate starting symbol, a starting symbol and/or a RO position set (1054).

Referring now to operation (1052), and in some embodiments, a wireless communication device (e.g., a UE) may receive and/or obtain a RACH signaling. For instance, the wireless communication node (e.g., a BS) may send, transmit, communicate, and/or broadcast a RACH signaling (and/or other types of signaling) to the wireless communication device. The wireless communication device may receive and/or obtain the RACH signaling from the wireless communication node. In one example, the wireless communication device may receive a PRACH Configuration Index (e.g., PRACH Config.Index) and/or other information from the wireless communication node via the RACH signaling. As such, the RACH signaling can be used to provide, specify, and/or indicate the PRACH Configuration Index and/or other information to the wireless communication device.

Referring now to operation (1054), and in some embodiments, the wireless communication device may determine and/or identify a candidate starting symbol and/or a candidate RO set (and/or other ROs) for a SCS higher than 120 kHz and/or 60 kHz. For instance, the wireless communication node may cause the wireless communication device to determine the candidate starting symbol and/or the candidate RO set. The wireless communication device may determine the candidate starting symbol according to (or based on) information in the RACH signaling. For instance, the RACH signaling may include, provide, and/or specify a candidate starting symbol and/or other information associated with a PRACH Config.Index (and/or other PRACH indices). As such, the wireless communication device may determine the candidate starting symbol according to (or by using) the starting symbol specified in the RACH signaling.

In some embodiments, the wireless communication device may determine, configure, and/or identify the candidate starting symbol and/or a candidate RO set for a SCS higher than 120 kHz and/or 60 kHz. For instance, the wireless communication device may determine the candidate starting symbol and/or the candidate RO set (e.g., for a SCS higher than 120 kHz and/or 60 kHz) according to a starting symbol for a slot with a SCS of 120 KHz or 60 KHz (e.g., a symbol index of the 120 kHz slot that aligns with one or more ROs of a higher SCS). In some embodiments, the wireless communication device may receive and/or obtain a signaling (e.g., RRC signaling, MAC CE signaling, DCI signaling, and/or other types of signaling) from the wireless communication node. The signaling can indicate and/or provide a RO position set (and/or other ROs). In some embodiments, the wireless communication device may determine the starting symbol for a SCS higher than 120 kHz and/or 60 kHz according to (or by using) the received signaling (e.g., according to the RO position set). For instance, the wireless communication device may determine said starting symbol includes or corresponds to at least one candidate RO position set.

In some embodiments, the RO position set can include and/or identify one candidate RO position set (e.g., RO0, RO1, RO2, RO3, or other candidate RO positions). In FIG. 7A, for example, a first RO $$\left(\text{e.g., } n_t^{RA} = 0\right)$$

can be located in a RO position set corresponding to RO0 (e.g., the candidate RO position set {RO1} corresponds to the 2 ROs for SCS=480 kHz in a 120 kHz slot). As such, the RO position set (e.g., provided by the signaling) may corresponding to RO0, for example. In some embodiments, the RO position set may identify and/or include at least two candidate RO position sets. For example, the at least two candidate RO position sets may comprise {RO0, RO1}, {RO0, RO2}, {RO0, RO3}, {RO1, RO2}, {RO1, RO3}, {RO2, RO3}, {RO0, RO4}, {RO1, RO5}, {RO2, RO6}, {RO3, RO7}, and/or other combinations of two or more candidate RO position sets. In FIG. 7A (for instance, refer to the pattern of RO0) and FIG. 7D (for instance, refer to the pattern of RO2), for example, a first RO $$\left(\text{e.g., } n_t^{RA} = 0\right)$$

can be located in a RO position set corresponding to {RO0, RO2} (e.g., for SCS=480 kHz). As such, the RO position set (e.g., provided by the signaling) can include an RO position set corresponding to RO0 and/or RO2, for example. In some embodiments, the signaling may comprise a RRC signaling, a MAC CE signaling, a DCI signaling, and/or other types of signaling. In some embodiments, the wireless communication device may determine a RO position set according to a default/defined configuration (e.g., instead of according to a received signaling). The default configuration may include or correspond to a default/configured/defined/predefined/predetermined RO position set and/or a default candidate RO position set. The RO position set may identify, indicate, and/or specify at least one candidate position set (e.g., RO0, RO1, RO2, . . . , RO7). In some embodiments, the RO position set may identify at least two candidate RO position sets (e.g., {RO0, RO1}, {RO0, RO2}, {RO0, RO3}, and/or other candidate position set(s)).

In some embodiments, the default configuration may include at least one parameter (e.g., specified in a random access configuration table). For SCS=480 kHz, the at least one parameter may have a first value, a second value, a third value, and/or a fourth value. For SCS=960 kHz, the at least one parameter may have a first value, a second value, a third value, a fourth value, a fifth value, a sixth value, a seventh value, and/or an eighth value. A first value may indicate that the RO position set includes one candidate RO position set (e.g., {RO0}). A second value may indicate that the RO position set includes two candidate RO position sets (e.g., {RO0, RO1}), and/or four candidate RO position sets (e.g., {RO0, RO1, RO2, RO3}). A third value may indicate that the RO position set includes three candidate RO position sets (e.g., {RO0, RO1, RO3}). A fourth value may indicate that the RO position set includes four candidate RO position sets (e.g., {RO0, RO1, RO2, RO3}). A fifth value may indicate that the RO position set includes five candidate RO position sets (e.g., {RO0, RO1, RO2, RO3, RO4}). A sixth value may indicate that the RO position set includes six candidate RO position sets (e.g., {RO0, RO1, RO2, RO3, RO4, RO5}). A seventh value may indicate that the RO position set includes seven candidate RO position sets (e.g., {RO0, RO1, RO2, RO3, RO4, RO5, RO6}). An eighth value may indicate that the RO position set includes eight candidate RO position sets (e.g., {RO0, RO1, RO2, RO3, RO4, RO5, RO6, RO7}).

In some embodiments, the symbol position $l_0$ may be a function of at least one of:

$$l_0,\ n_t^{RA},\ N_{dur}^{RA},\ n_{slot}^{RA},$$

and/or Δl. In some embodiments, $l_0$ may be a (candidate) starting symbol with a SCS of 120 KHz and/or 60 KHz. A slot with a SCS of 120 kHz or 60 kHz may include or correspond to a slot that includes one or more RO resources. In some embodiments, $$n_t^{RA}$$

may be a RO within a slot with the SCS of 120 KHz and/or 60 KHz. The parameter $$n_t^{RA}$$

can be numbered in increasing order from 0 to $$n_t^{RA,slot} - 1$$

within the slot with the SCS of 120 KHz and/or 60 KHz in one candidate RO set. In some embodiments, $$n_t^{RA,slot}$$

may be a number of ROs of one candidate RO position set within the slot with the SCS of 120 KHz and/or 60 KHz. In some embodiments, $$N_{dur}^{RA}$$

may be a number of symbols of a RO duration and/or PRACH duration. In some embodiments, $$n_{slot}^{RA}$$

may be a number of PRACH slots within a 60 KHz and/or 120 KHz slot per candidate RO position set (e.g., {RO0}). In some embodiments, $$n_{slot}^{RA}$$

may be a number of 120 KHz slots or 60 KHz in a 60 KHz or 120 KHz slot. In some embodiments, Δl may be a value corresponding to a candidate RO position set (e.g., {RO0}) offset of a symbol boundary of a SCS of 120 KHz and/or 60 KHz. In some embodiments, Δl may refer to a symbol level offset between the candidate starting symbol and a starting symbol of the candidate RO position set.

In some embodiments, the function may include at least one of:

$$n_t^{RA} N_{dur}^{RA} * 2^{\mu-3} (\mu > 3),\ 14 n_{slot}^{RA} * 2^{\mu-3} (\mu > 3),$$

and/or μ. In some embodiments, $$n_t^{RA} N_{dur}^{RA} * 2^{\mu-3} (\mu > 3)$$

may refer to symbols of one or more ROs in the slot with the SCS of 120 KHz or 60 KHz. In some embodiments, $$14 n_{slot}^{RA} * 2^{\mu-3} (\mu > 3)$$

may refer to symbols of the slot with the SCS of 120 KHz or 60 KHz. In some embodiments, y can be a PRACH SCS. In some embodiments, l may be determined by $$l = l_0 + n_t^{RA} N_{dur}^{RA} * 2^{\mu-3} + \Delta l + 14 n_{slot}^{RA} * 2^{\mu-3} (\mu > 3),$$

$$l = l_0 * 2^{\mu-3} + n_t^{RA} N_{dur}^{RA} * 2^{\mu-3} + \Delta l + 14 n_{slot}^{RA} * 2^{\mu-3} (\mu > 3),$$

-continued $$l = l_0 + n_t^{RA} N_{dur}^{RA} * 2^{\mu-3} + \Delta l * N_{dur}^{RA} + 14 n_{slot}^{RA} * 2^{\mu-3} (\mu > 3),$$

$$\text{and/or } l = l_0 * 2^{\mu-3} + n_t^{RA} N_{dur}^{RA} * 2^{\mu-3} + \Delta l * N_{dur}^{RA} + 14 n_{slot}^{RA} * 2^{\mu-3} (\mu > 3).$$

In some embodiments, Δl may include or correspond to x (e.g., Δl=x) for a x-th position set (e.g., {RO0} is the first candidate RO set, {RO1} is the second candidate RO set, {RO2} is the third candidate RO set, {RO3} is the fourth candidate RO set). For instance, if a RO set='RO0', Δl={0}. In one example, if a RO set='RO1', Δl={1}. In another example, if a RO set='RO2', Δl={2}. In some embodiments (e.g., at least two candidate RO position sets such as in case 1-3 and/or case 1-4), if a RO position set includes ROx, ROy, . . . , ROz (e.g., RO set={ROx, ROy, . . . , ROz}, Δl may include or correspond to x,y, . . . , z (e.g., Δl={x,y, . . . , z}). In some embodiments, Δl may be a set of values corresponding to indices of a plurality of candidate RO position sets. In some embodiments, Δl may refer to a set of symbol level offset(s) between the candidate starting symbol and the starting symbol of each candidate RO position set.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller.

Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device from a wireless communication node, a random access channel (RACH) signaling comprising a configuration index specifying a RACH pattern of a RACH slot for a first subcarrier spacing (SCS) which is one of 60 kiloHertz (kHz) or 120 kHz, the RACH pattern including a number of RACH occasions (ROs) and the configuration index including a value associated with a starting symbol; and determining, by the wireless communication device, a candidate starting symbol for a second SCS higher than the first SCS and a gap to be inserted within the RACH slot and between the ROs 120 kiloHertz (KHz) or 60 KHz, according to information in the RACH signaling, to cause the candidate starting symbol at the second SCS to maintain a symbol boundary which corresponds with the starting symbol at the first SCS, when the gap is inserted between the ROs for the second SCS.

2. The method of claim 1, comprising:

receiving, by the wireless communication device from the wireless communication node, a signaling that indicates a RO position set, the RO position set identifying one candidate RO position set.

3. The method of claim 2, wherein the signaling comprises:

a radio resource configuration (RRC) signaling, a medium access control control element (MAC CE) signaling, or a downlink control information (DCI) signaling.

4. The method of claim 1, comprising:

receiving, by the wireless communication device from the wireless communication node, a signaling that indicates a RO position set, the RO position set identifying at least two candidate RO position sets.

5. The method of claim 1, comprising:

determining, by the wireless communication device according to a default configuration, a RO position set, the RO position set identifying one candidate RO position set.

6. The method of claim 5, wherein the default configuration includes a parameter having:

a first value that indicates that the RO position set includes one candidate RO position set; or a second value that indicates that the RO position set includes two candidate RO position sets; or a third value that indicates that the RO position set includes three candidate RO position sets; or a fourth value that indicates that the RO position set includes four candidate RO position sets; or a fifth value that indicates that the RO position set includes five candidate RO position sets; or a sixth value that indicates that the RO position set includes six candidate RO position sets; or a seventh value that indicates that the RO position set includes seven candidate RO position sets; or an eighth value that indicates that the RO position set includes eight candidate RO position sets.

7. The method of claim 1, comprising:

determining, by the wireless communication device according to a default configuration, a RO position set, the RO position set identifying at least two candidate RO position sets.

8. The method of claim 1, wherein a symbol position (l) is a function of at least one of:

$l_o$, a candidate starting symbol with a SCS of 120 KHz or 60 KHz;

$$n_t^{RA},$$

a RO within a slot with the SCS of 120 KHz or 60 KHz, numbered in increasing order from 0 to $$N_t^{RA,slot} - 1$$

within the slot with the SCS of 120 KHz or 60 KHz in a candidate RO position set, where $$N_t^{RA,slot}$$

is a number of RO in one candidate RO position set within the slot with the SCS of 120 KHz or 60 KHz;

$$N_{dur}^{RA},$$

a number of symbols of a RO duration or physical RACH (PRACH) duration;

$$n_{slot}^{RA},$$

a number of PRACH slots within a 60 KHz or 120 KHz slot per candidate RO position set, or a number of 120 KHz slot or 60 Khz slot in the 60 KHz or 120 KHz slot; or Δl, a value corresponding to a candidate RO position set offset of a symbol boundary of the SCS of 120 KHz or 60 KHz, or a value corresponding to a symbol level offset between the candidate starting symbol and a starting symbol of the candidate RO position set.

9. The method of claim 8, wherein the function includes at least one of:

$$n_t^{RA} N_{dur}^{RA} * 2^{\mu-3} (\mu > 3),$$

which refers to symbols of one or more ROs in the slot with the SCS of 120 KHz or 60 KHz;

$$14n_{slot}^{RA}*2^{\mu-3}(\mu>3),$$

which refers to symbols of the slot with the SCS of 120 KHz or 60 KHz; or

μ, which is a PRACH SCS.

10. The method of claim 8, wherein the symbol position (l) is determined by:

$$l=l_0+n_t^{RA}N_{dur}^{RA}*2^{\mu-3}+\Delta l+14n_{slot}^{RA}*2^{\mu-3}(\mu>3),$$

$$l=l_0*2^{\mu-3}+n_t^{RA}N_{dur}^{RA}*2^{\mu-3}+\Delta l+14n_{slot}^{RA}*2^{\mu-3}(\mu>3),$$

$$l=l_0+n_t^{RA}N_{dur}^{RA}*2^{\mu-3}+\Delta l*N_{dur}^{RA}+14n_{slot}^{RA}*2^{\mu-3}(\mu>3),\text{ or}$$

$$l=l_0*2^{\mu-3}+n_t^{RA}N_{dur}^{RA}*2^{\mu-3}+\Delta l*N_{dur}^{RA}+14n_{slot}^{RA}*2^{\mu-3}(\mu>3).$$

11. The method of claim 8, wherein for a x-th candidate RO position set, Δl=x.

12. The method of claim 8, wherein for a plurality of candidate RO position sets, Δl is a set of values corresponding to indices of the plurality of candidate RO position sets, or a set of values corresponding to one or more symbol level offsets between the candidate starting symbol and a starting symbol of each candidate RO position set.

13. A method comprising:

sending, by a wireless communication node to a wireless communication device, a random access channel (RACH) signaling comprising a configuration index specifying a RACH pattern of a RACH slot for a first subcarrier spacing (SCS) which is one of 60 kiloHertz (kHz) or 120 kHz, the RACH pattern including a number of RACH occasions (ROs) and the configuration index including a value associated with a starting symbol; and causing the wireless communication device to determine a candidate starting symbol for a second SCS higher than the first SCS and a gap to be inserted within the RACH slot and between the ROs, according to information in the RACH signaling, to cause the candidate starting symbol at the second SCS to maintain a symbol boundary which corresponds with the starting symbol at the first SCS, when the gap is inserted between the ROs for the second SCS.

14. A wireless communication device comprising:

at least one processor configured to:

receive, via a receiver from a wireless communication node, a random access channel (RACH) signaling comprising a configuration index specifying a RACH pattern of a RACH slot for a first subcarrier spacing (SCS) which is one of 60 kiloHertz (kHz) or 120 kHz, the RACH pattern including a number of RACH occasions (ROs) and the configuration index including a value associated with a starting symbol; and determine a candidate starting symbol for a second SCS higher than the first SCS and a gap to be inserted within the RACH slot and between the ROs, according to information in the RACH signaling, to cause the candidate starting symbol at the second SCS to maintain a symbol boundary which corresponds with the starting symbol at the first SCS, when the gap is inserted between the ROs for the second SCS.

15. A wireless communication node comprising:

at least one processor configured to send, via a transmitter to a wireless communication device, a random access channel (RACH) signaling comprising a configuration index specifying a RACH pattern of a RACH slot for a first subcarrier spacing (SCS) which is one of 60 kiloHertz (kHz) or 120 kHz, the RACH pattern including a number of RACH occasions (ROs) and the configuration index including a value associated with a starting symbol, wherein the wireless communication device determines a candidate starting symbol for a second SCS higher than the first SCS and a gap to be inserted within the RACH slot and between the ROs, according to information in the RACH signaling, to cause the candidate starting symbol at the second SCS to maintain a symbol boundary which corresponds with the starting symbol at the first SCS, when the gap is inserted between the ROs for the second SCS.

16. The wireless communication node of claim 15, wherein the at least one processor is configured to:

send, via a transmitter to the wireless communication device, a signaling that indicates a RO position set, the RO position set identifying one candidate RO position set.

17. The wireless communication node of claim 16, wherein the signaling comprises:

a radio resource configuration (RRC) signaling, a medium access control control element (MAC CE) signaling, or a downlink control information (DCI) signaling.

18. The wireless communication node of claim 15, wherein the at least one processor is configured to:

send, via a transmitter to the wireless communication device, a signaling that indicates a RO position set, the RO position set identifying at least two candidate RO position sets.

* * * * *